(12) United States Patent
Forster

(10) Patent No.: US 11,143,876 B2
(45) Date of Patent: Oct. 12, 2021

(54) OPTICAL AXIS CONTROL BASED ON GAZE DETECTION WITHIN A HEAD-MOUNTABLE DISPLAY

(71) Applicant: Sony Interactive Entertainment Inc., Tokyo (JP)

(72) Inventor: Richard James Forster, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/954,375

(22) PCT Filed: Oct. 24, 2018

(86) PCT No.: PCT/GB2018/053081
§ 371 (c)(1),
(2) Date: Jun. 16, 2020

(87) PCT Pub. No.: WO2019/122800
PCT Pub. Date: Jun. 27, 2019

(65) Prior Publication Data
US 2021/0088790 A1    Mar. 25, 2021

(30) Foreign Application Priority Data
Dec. 20, 2017 (GB) .................................. 1721426

(51) Int. Cl.
G09G 5/00      (2006.01)
G02B 27/01     (2006.01)
(Continued)

(52) U.S. Cl.
CPC ..... *G02B 27/0172* (2013.01); *G02B 27/0093* (2013.01); *G02B 27/0176* (2013.01);
(Continued)

(58) Field of Classification Search
CPC ............... G02B 27/0172; G02B 27/93; G02B 27/0176; G06G 3/13
(Continued)

(56) References Cited

U.S. PATENT DOCUMENTS 9,116,337 B1   8/2015   Miao
9,779,478 B1   10/2017  Wilson
(Continued)

FOREIGN PATENT DOCUMENTS

WO    2017192887 A2    11/2017

OTHER PUBLICATIONS

Combined Search and Examination Report for corresponding Application GB1721426.3, 3 pages, dated Jun. 18, 2018.
(Continued)

*Primary Examiner* — Jonathan M Blancha
(74) *Attorney, Agent, or Firm* — Matthew B. Dernier, Esq.

(57) ABSTRACT

A head-mountable display (HMD) apparatus includes a display unit configured to display an image to a user wearing the HMD, a first optical element configured to direct light from the image displayed by the display unit for viewing by the user so that the eye of the user observes the image via the first optical element, a detector configured to detect a gaze direction of the user's eye, and a control unit configured to control a configuration of the first optical element responsive to the detected gaze direction.

17 Claims, 20 Drawing Sheets

(51) Int. Cl.
　　　*G02B 27/00*　　　(2006.01)
　　　*G06F 3/01*　　　(2006.01)
(52) U.S. Cl.
　　　CPC .......... *G06F 3/013* (2013.01); *G02B 27/0101* (2013.01); *G02B 2027/011* (2013.01); *G02B 2027/0138* (2013.01)
(58) Field of Classification Search
　　　USPC ........................................................... 345/7
　　　See application file for complete search history.

(56) References Cited

U.S. PATENT DOCUMENTS

| | | |
|---|---|---|
| 2015/0077312 A1 | 3/2015 | Wang |
| 2015/0116203 A1* | 4/2015 | Narita .................... G06T 5/002 345/156 |
| 2015/0378161 A1 | 12/2015 | Bailey |
| 2016/0012855 A1* | 1/2016 | Krishnan ............. G11B 27/105 386/241 |
| 2017/0184847 A1* | 6/2017 | Petrov .................. H04N 5/2256 |
| 2017/0358136 A1* | 12/2017 | Gollier .................... G06F 1/163 |
| 2018/0136720 A1* | 5/2018 | Spitzer ...................... G06T 1/20 |
| 2018/0276790 A1* | 9/2018 | Mantor ................. G06T 3/0093 |
| 2019/0018236 A1* | 1/2019 | Perreault ................. G06F 3/013 |

OTHER PUBLICATIONS

International Search Report and Written Opinion for corresponding PCT Application No. PCT/GB2018/053081, 12 pages, dated Jan. 23, 2019.

* cited by examiner

LEFT RIGHT

OPTICAL AXIS CONTROL BASED ON GAZE DETECTION WITHIN A HEAD-MOUNTABLE DISPLAY

BACKGROUND

Field of the Disclosure

This disclosure relates to virtual reality apparatus and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Although the original development of HMDs and virtual reality was perhaps driven by the military and professional applications of these devices, HMDs are becoming more popular for use by casual users in, for example, computer game or domestic computing applications.

The techniques to be discussed are applicable to individual three-dimensional images or to video signals comprising successive three-dimensional images. Therefore, references to "images" in the discussion below should be taken to encompass the use of the same techniques in respect of video signals.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides a head-mountable display apparatus comprising:

a display unit configured to display an image to a user wearing the HMD;

a first optical element configured to direct light from the image displayed by the display unit for viewing by the user so that the eye of the user observes the image via the first optical element;

a detector configured to detect a gaze direction of the user's eye; and a control unit configured to control a configuration of the first optical element responsive to the detected gaze direction.

Another example embodiment provides a method for controlling an image viewed by a user wearing an HMD, the method comprising:

displaying an image to a user wearing the HMD;

directing light from the displayed image for viewing by the user using a first optical element so that the eye of the user observes the image via the first optical element;

detecting a gaze direction of the user's eye; and controlling a configuration of the first optical element responsive to the detected gaze direction.

Another example embodiment provides computer software which, when executed by a computer, causes the computer to perform the steps of the method defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE EMBODIMENTS

Figure 1:
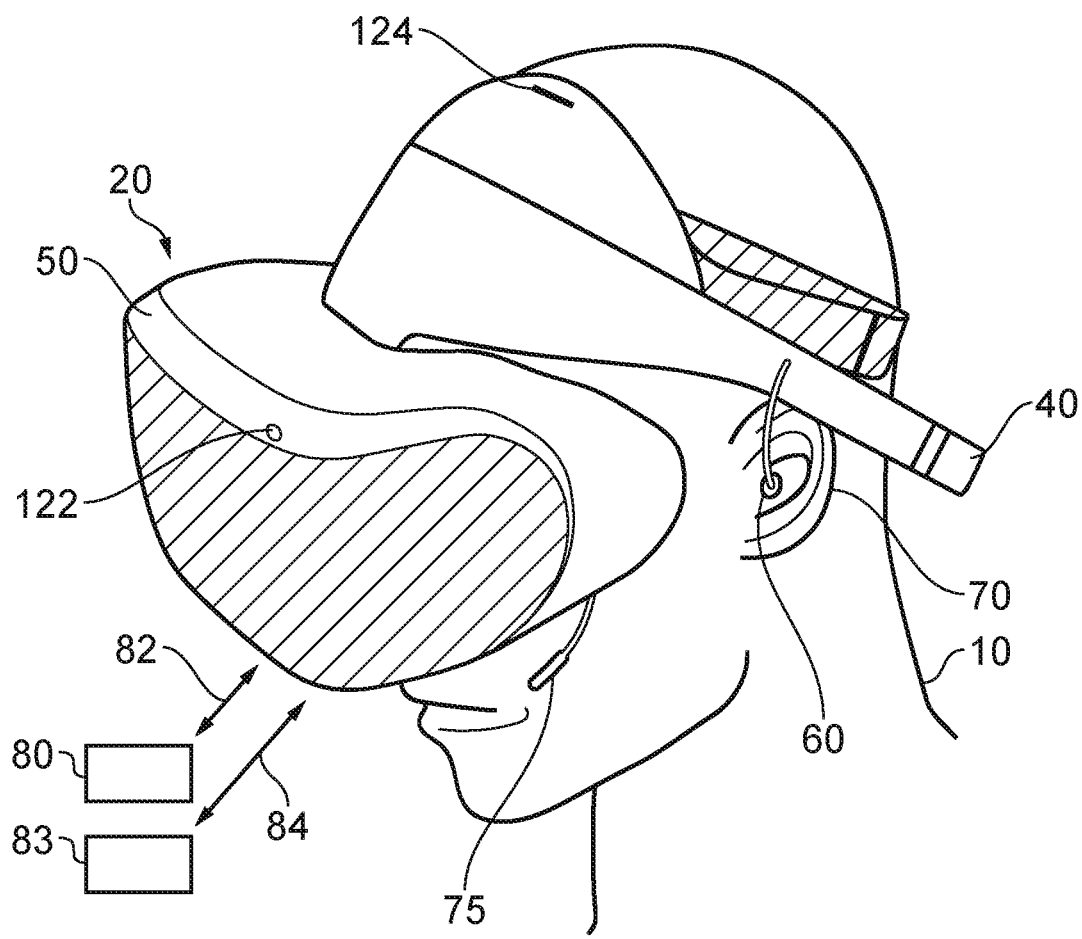
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display unit (display element) mounted with respect to each of the eye display positions, the display unit providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display unit 150 and one or more optical elements 160. The way in which the display unit and the optical element(s) cooperate to provide a display to the user will be described with reference to FIG. 3.

Figure 3:
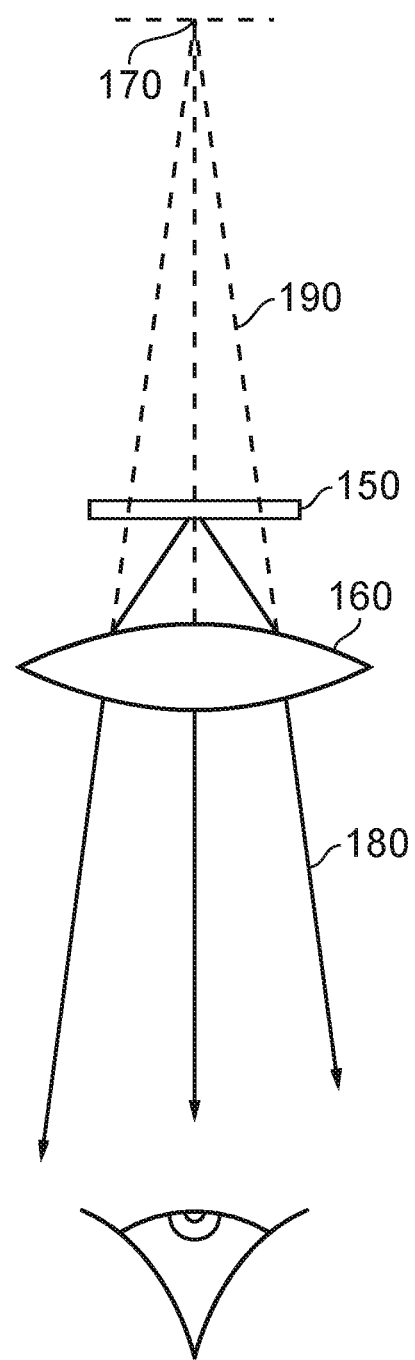
FIG. 3 schematically illustrates the formation of a virtual image by an HMD.

Referring to FIG. 3, the display unit 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display unit 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
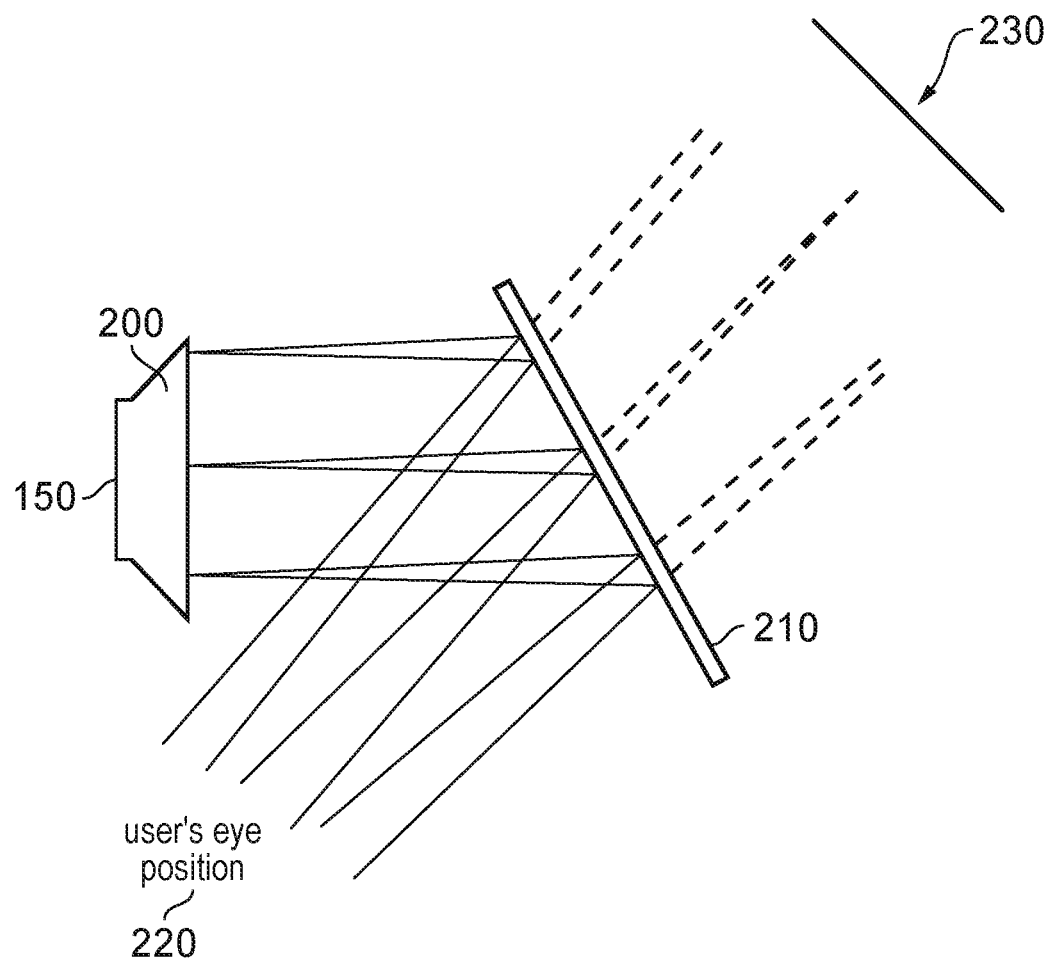
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display unit 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display unit and optical elements can be located closer to the centre of gravity of the user's head and to the side of the user's eyes, which can produce a less bulky HMD for the user to wear.

Alternatively, if the HMD is designed not to completely obscure the user's view of the external environment, the mirror 210 can be made partially reflective so that the user sees the external environment, through the mirror 210, with the virtual image superposed over the real external environment.

It will be appreciated that in the case of lenses, the positioning of a lens in an optical path between a display and an eye might well involve positioning the lens at a physical position between the display and the eye. In the case of a mirror, positioning the mirror in an optical path between the display and the eye might involve the mirror not being physically between the display and eye.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
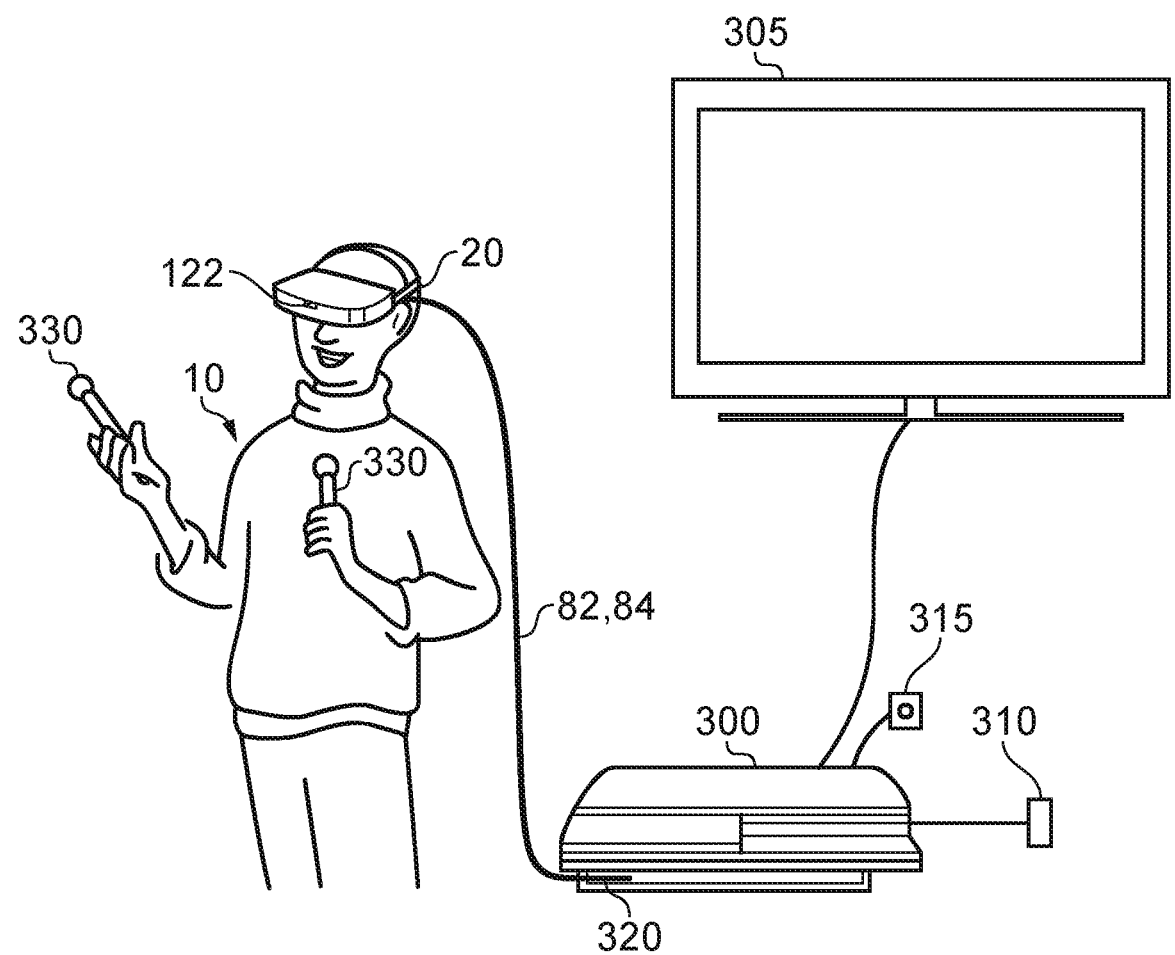
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84.

Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
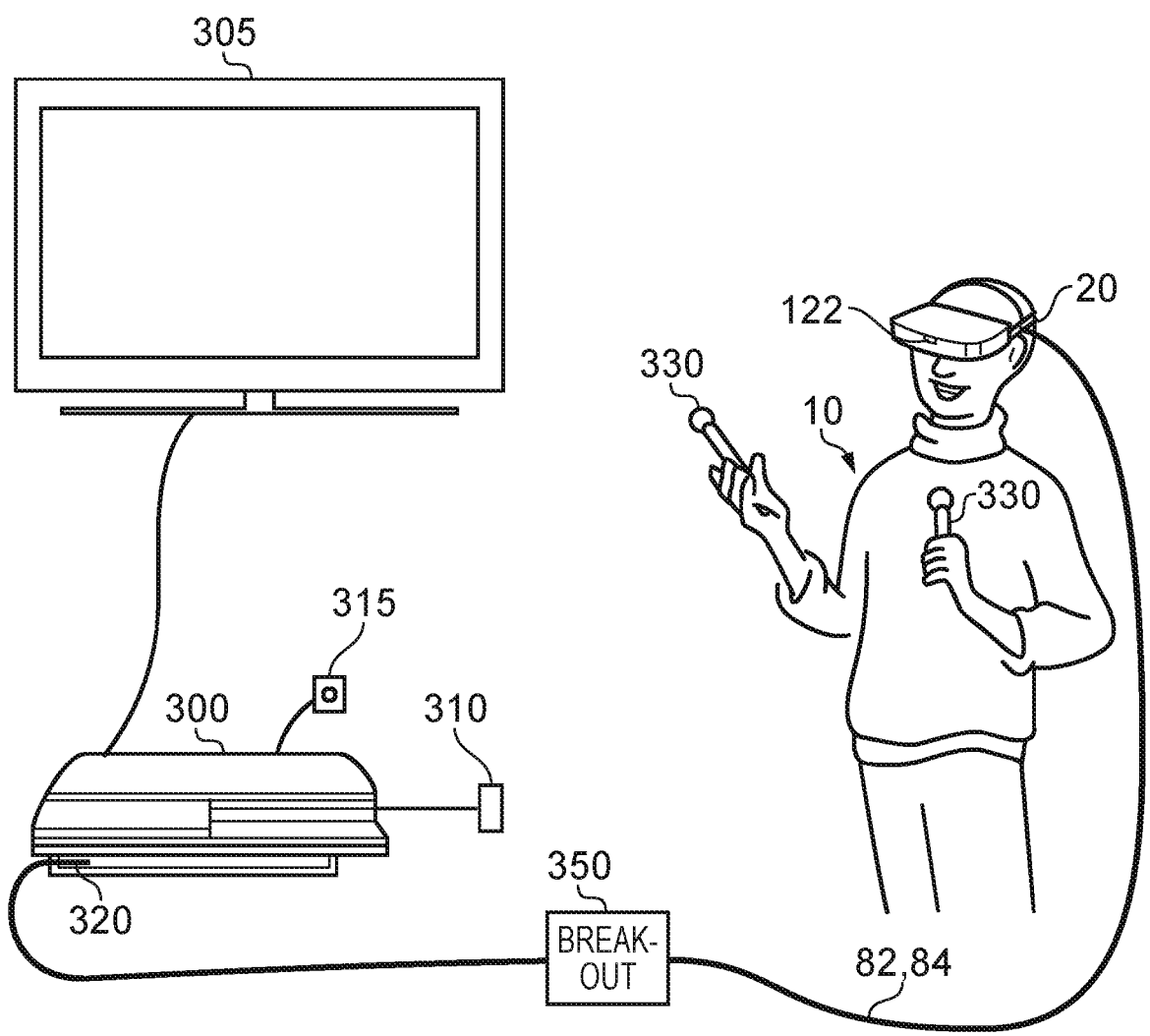

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. the user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
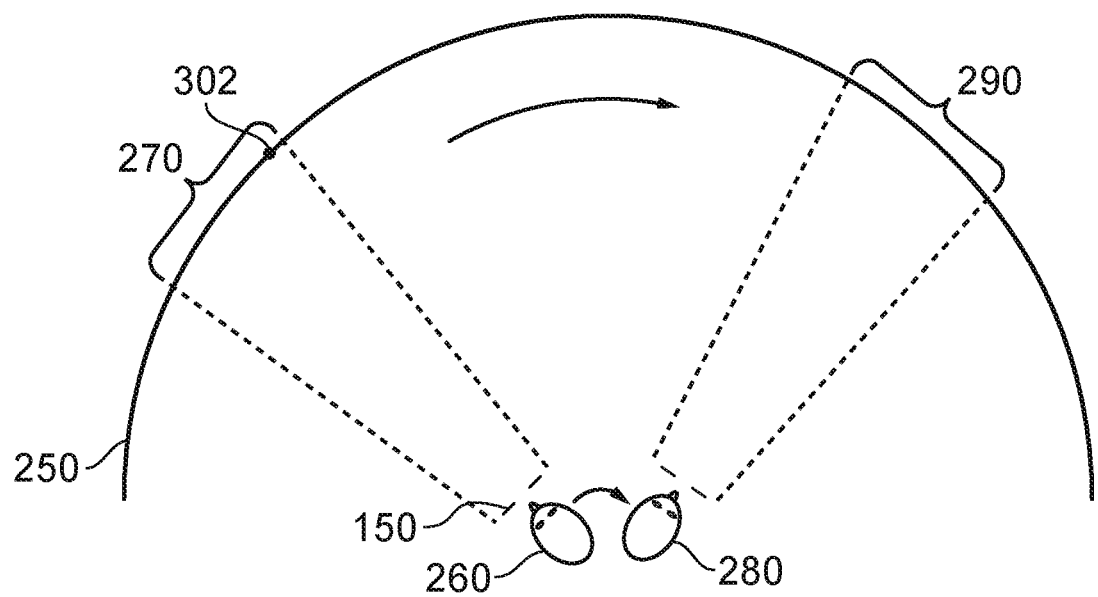
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display units 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
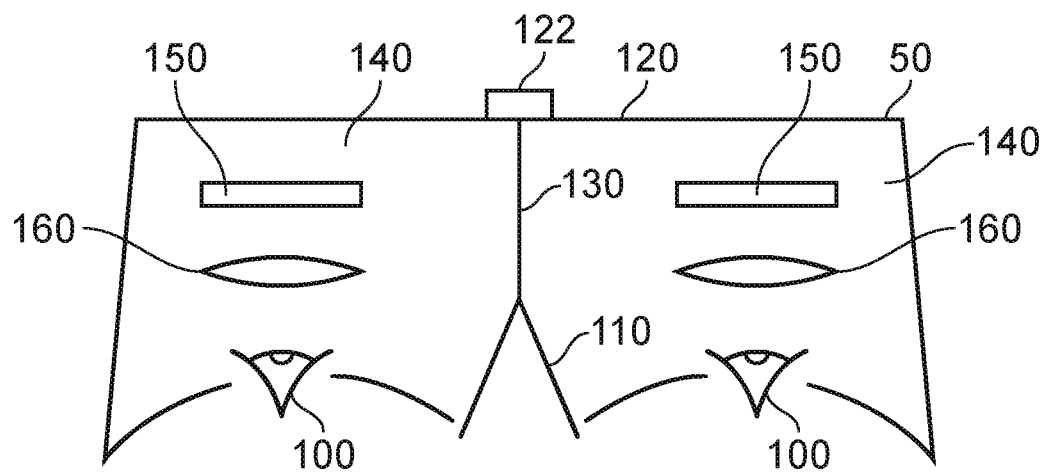
FIG. 2 is a schematic plan view of an HMD.
Figure 9A:
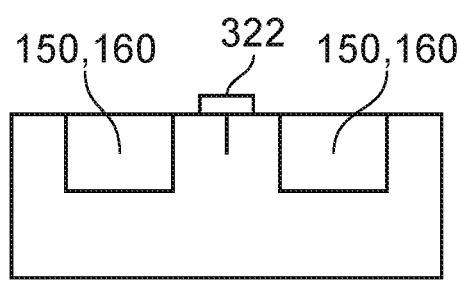
FIGS. 9a and 9b schematically illustrate HMDs with motion sensing.
Figure 9B:
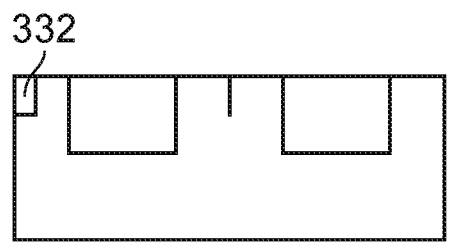

FIGS. 9*a* and 9*b* schematically illustrated HMDs with motion sensing. The two drawings are in a similar format to that shown in FIG. 2. That is to say, the drawings are schematic plan views of an HMD, in which the display unit 150 and optical elements 160 are represented by a simple box shape. Many features of FIG. 2 are not shown, for clarity of the diagrams. Both drawings show examples of HMDs with a motion detector for detecting motion of the observer's head.

In FIG. 9*a*, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9*b* makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
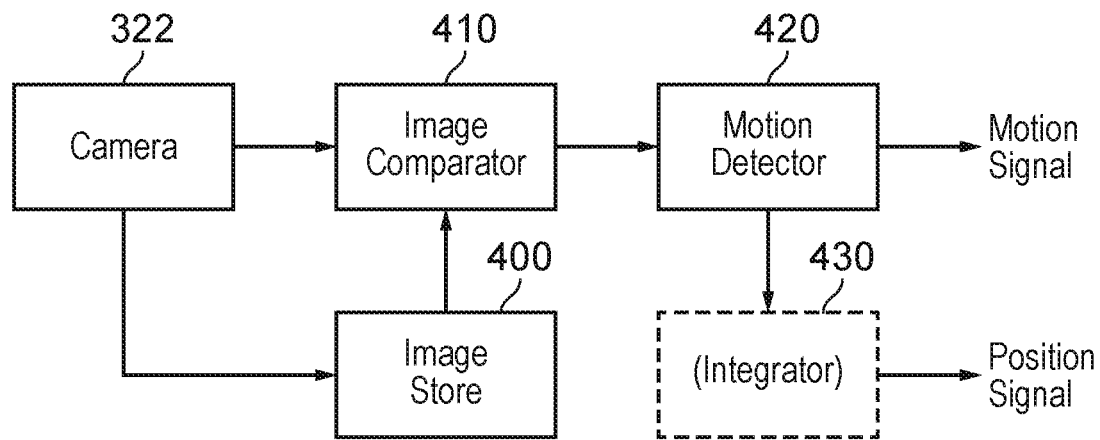
FIG. 10 schematically illustrates a position sensor based on optical flow detection.

FIG. 10 schematically illustrates one example of motion detection using the camera 322 of FIG. 9*a*.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
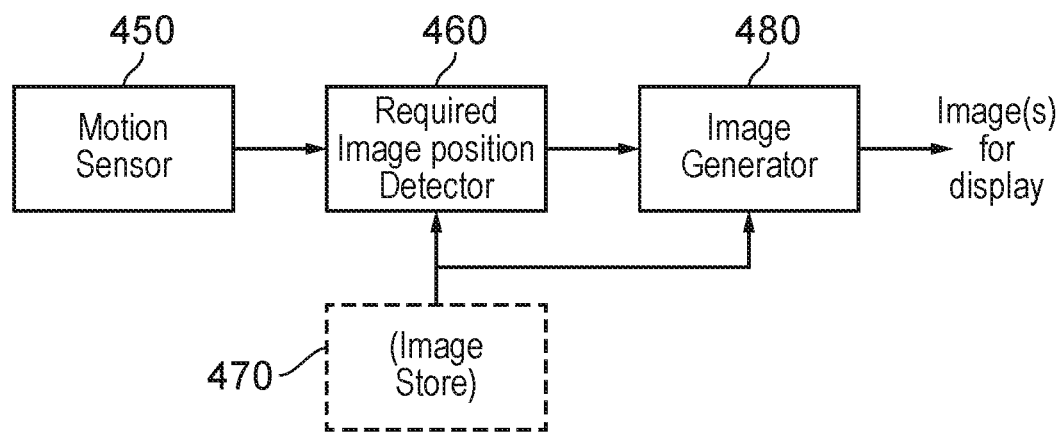
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9*b*) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The operations to be discussed below relate to controlling an HMD apparatus in response to a detected gaze direction for a user wearing the HMD. A processor provided as part of the HMD 20 or as part of another processing device (e.g. the games console 300, or the intermediate device 350) can generate an image to be displayed by the display unit 150 (display element) of the HMD 20. An eye 100 of the user 10 can view the image displayed by the display unit 150 by observing the light emitted by the display unit 150. Light emitted by the display unit 150 corresponding to the displayed image can be directed by the optical element 160 positioned in an optical path between the display element 150 and the eye 100 of the user 10 wearing the HMD 20. The optical element 160 may comprise one or more lenses (such as a convex lens and/or a concave lens), or one or more mirrors (such as the mirror 210), or a combination of mirrors and lenses, which can be used to direct light emitted from the display unit 150 for viewing by the user 10 so that the user's eye 100 observes the image via the optical element 160. The optical element 160 can direct light from the displayed image towards the user's eye 100 so that the user views a virtual image 170 that appears to be further away from the user than the real image displayed on the display unit 150. The light from the display unit 150 may also be directed by the optical element 160 so that the extent of the display unit 150, and thus the extent of the displayed image viewed by the user's eye 100 at a given time, referred to as the field of view, can be increased or decreased depending on the properties of the optical element 160.

However, when the gaze of the user's eye 100 is directed towards the periphery of the user's field of view (away from the centre of the display element 150) towards the periphery of the optical element 160, the geometric properties (e.g. varying thickness, varying refractive index of material, varying surface curvature) of the optical element 160 may cause optical distortion of the light from the display element 150 directed for viewing by the user 10 to vary depending on the gaze direction of the user's eye. The geometric properties of the optical element 160 may mean that light is directed differently by different portions of the optical element 160, and the image may be observed by the user's eye with a varying degree of optical distortion depending on the portion of the optical element responsible for directing the light viewed by the user's eye. The optical distortion of the light viewed by the user's eye may be such that the image observed by the user's eye is a distorted representation of the image displayed by the display unit 150, and the light viewed by the user may comprise light from a varying number of pixels of the display unit 150 depending on the degree of optical distortion. As such, the optical distortion of the light directed by the optical element 160 can mean that the virtual image 170 viewed by the user appears distorted with the degree of distortion being greatest when the gaze of the user's eye is directed towards the periphery of the user's field of view due to the properties of the optical element 160. When the user's gaze is directed towards the periphery of the user's field of view, the greater degree of distortion can mean that the virtual image 170 viewed by the user comprises light from fewer pixels of the image displayed by the display unit 150 in comparison to when the user's gaze is directed more centrally in the user's field of view.

Figure 12:
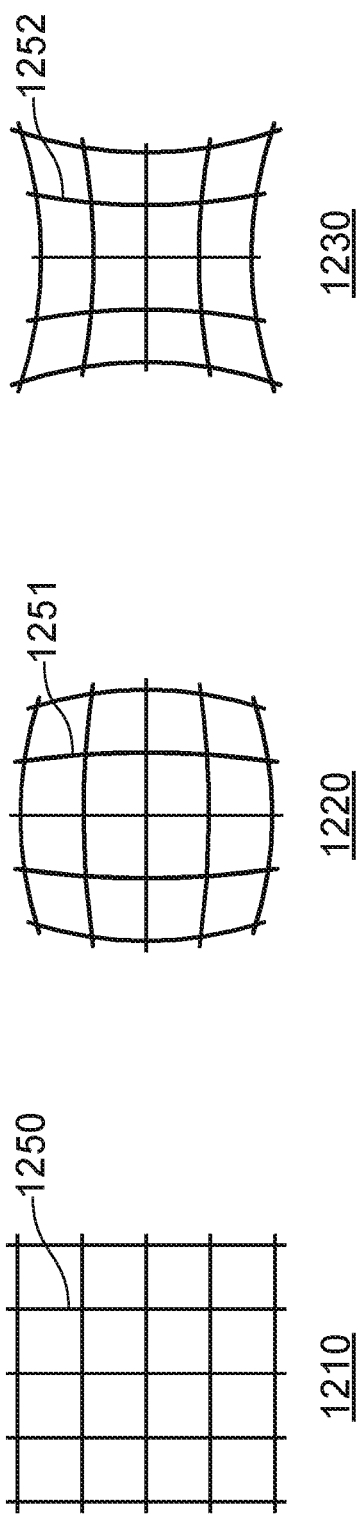
FIG. 12 schematically illustrates an undistorted image, a pincushion distorted image and a barrel distorted image.

FIG. 12 schematically illustrates an undistorted image, 1210 a barrel distorted image 1220 and a pincushion distorted image 1230. Distortion of light may occur when light is directed (e.g. converged or diverged) by an optical element 160 that comprises one or more lenses and/or one or more mirrors. For example, the geometry of a lens may mean that light that is incident upon the lens may be refracted differently by different portions of the lens, and thus light may be directed differently depending on which portion of the lens is responsible for directing the light. Similarly, the geometry of a mirror may mean that light that is incident upon the mirror is reflected differently for different portions of the mirror, and thus light may be directed differently depending upon which portion of the mirror is responsible for directing the light. As such, the geometric properties of the optical element 160 may mean that different portions of the optical element 160 have different optical properties that may vary for different portions of the optical element 160.

In some examples, a real lens with a curved surface may direct rays of light such that the rays refracted by the most peripheral portions of the lens (furthest from the optical axis of the lens) are subjected to a greater amount of refraction than rays of light refracted by a more central portion of the lens. For example, spherical aberration is an optical effect that can occur due to light being refracted differently by a peripheral portion of a lens compared to a central portion of the lens, which may mean that rays of light focused by the lens do not all meet at the focal point, which results in an imperfection of the observed image. In some cases the rays of light refracted by the most peripheral portions of the lens may intersect the optical axis at a distance that is closer to the lens compared to the rays of light refracted by the more central portions of the lens (positive spherical aberration). Therefore, rays of light which are initially parallel to the optical axis but pass through the lens at different distances from the optical axis (central axis passing through centre of curvature of the lens) may be refracted by the lens such that directed rays of light fail to converge at the same point. The focal length and the magnification (ratio of a subject's real size to an observed size of the subject), which is dependent on focal length, may vary for different portions of the optical element 160 such that the magnification of the central portion of the lens may be different to the magnification of the peripheral portion of the lens. For example, the focal length of a lens can vary with respect to radial distance from the centre of the lens (radial distance from optical axis of lens) meaning that the magnitude of the magnification may increase or decrease with respect to radial distance from the centre of the lens, such that the outermost portions of the lens may exhibit the greatest difference in magnification compared to the central portion of the lens. The magnification of the lens may vary depending upon a distance with respect to the optical axis of the lens (central axis about which there is rotational symmetry), and light that is directed for viewing by the user's eye via a portion of the lens most distant (large off-axis distance) from the optical axis of the lens may be observed by the user's eye with a different magnification to light that is directed by a portion of the lens closer (small off-axis distance) to the optical axis of the lens.

As such, for an image observed via the optical element 160, some portions of the image may be observed by the user's eye as being distorted due to variations in the optical properties of the optical element 160. When the magnitude of the magnification increases with increasing distance from the centre of the lens, the distortion of the image is known as pincushion distortion. When the magnitude of the magnification decreases with increasing distance from the centre of the lens, the distortion of the image is known as barrel distortion.

An example of an undistorted image 1210 is shown where all of the lines (a line 1250 for example) in the image are straight irrespective of their position in the image with respect to the centre of the image. The straight lines of the image indicate that the geometric position of every point in the image is where the point is expected to be when there is no distortion, and the undistorted image thus provides a true representation of the real image. For example, a theoretically perfect lens that is free of aberration may direct light from the display element 150 so that the eye 100 of the user 10 observes the image 1210 and the observed image provides a true representation of the image displayed by the display element 150.

When observing an image via an optical element 160, optical distortion (such as barrel distortion or pincushion distortion) of the light may occur such that the image may be observed by the user's eye as having curved lines instead of straight lines. A barrel distorted image 1220 is shown where it can be seen that the lines that do not pass through the centre of the image are distorted such that they bow outwards away from the centre of the image (line 1251 for example). The curved lines indicate the geometric misplacement of information due to optical distortion. This means that portions of the image that are not located along a central axis (vertical or horizontal) of the image are distorted, such that a point in the image at a position that is displaced with respect to the central axis is displaced with respect to the position expected for the undistorted image 1210. Barrel distortion (also referred to as positive distortion) can cause points in the image to appear closer to the centre of the image than in comparison to when there is no distortion.

A pincushion distorted image 1230 is shown where it can be seen that the lines that do not pass through the centre of the image are distorted so that they bow inwards towards the centre of the image (line 1252 for example). This means that portions of the image that are not located along a central axis (vertical or horizontal) of the image are distorted such that a point in the image at a position that is displaced with respect to the central axis is displaced with respect to the position expected for the undistorted image 1210. Pincushion distortion (also referred to as negative distortion) can cause points in the image to appear further from the centre of the image than in comparison to when there is no distortion. For both the barrel distorted image 1220 and the pincushion distorted image 1230, it can be seen that the lines that do pass through the centre of the image remain straight and are thus undistorted meaning that a smaller degree of distortion is observed for the central portion of the image 1220, 1230 compared to the peripheral portion of the image 1220, 1230.

Figure 13A:
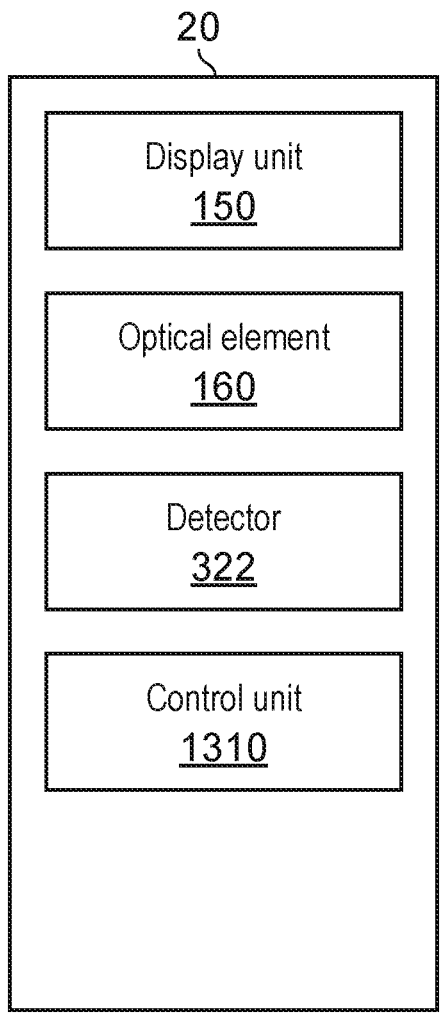
FIG. 13a schematically illustrates an HMD comprising a display unit, a first optical element, a detector and a control unit.

FIG. 13*a* schematically illustrates an HMD comprising a display unit, a first optical element, a detector and a control unit. In embodiments of the disclosure, an HMD apparatus is provided, comprising: a display unit 150 configured to display an image to a user wearing an HMD; a first optical element 160 configured to direct light from the image displayed by the display unit for viewing by the user so that the eye of the user observes the image via the first optical element; a detector 322 configured to detect a gaze direction of the user's eye; and a control unit 1310 configured to control a configuration of the first optical element responsive to the detected gaze direction. The HMD apparatus may comprise one or more display units 150, one or more optical elements 160 and one or more detectors 322. For example, a respective display unit 150 may be provided for each of the user's eyes or a single display unit 150 may be provided that is partitioned to provide a left image to the left eye and a right image to the right eye. The HMD apparatus may comprise a first optical element 160 configured to direct light from the image displayed by the display unit 150 and a second optical element 160 configured to direct light from the image displayed by the display unit 150 so that a first eye of the user observes the image displayed on the display unit 150 via the first optical element 160 and a second eye of the user observes the image displayed on the display unit 150 via the second optical element 160. The display unit 150 is configured to display an image to the user wearing the HMD 20, and the image may be generated by a processor that is provided as part of a processing device separate to the HMD 20 or by a processor provided as part of the HMD 20. As such, the HMD 20 may or may not comprise the processor responsible for generating the image displayed by the display unit 150.

Figure 13B:
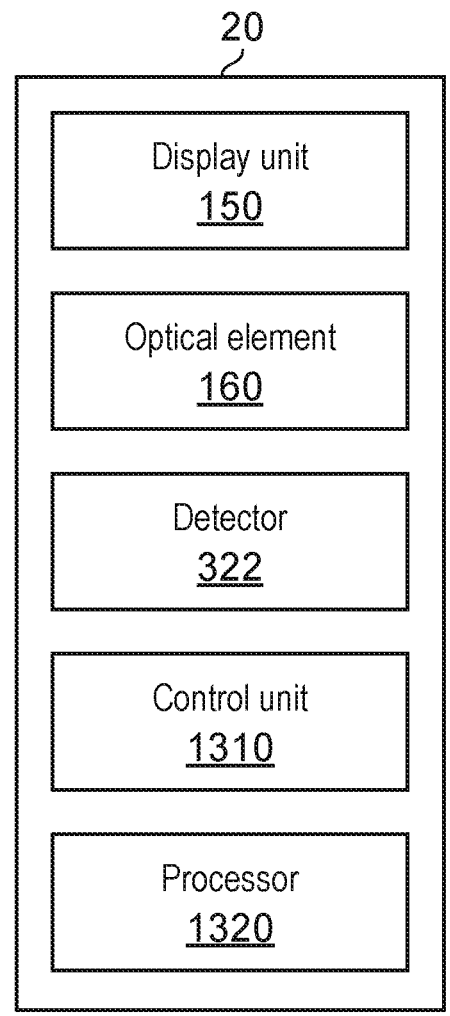
FIG. 13b schematically illustrates an HMD comprising a display unit, a first optical element, a detector, a control unit and a processor configured to generate an image.

FIG. 13*b* schematically illustrates an HMD comprising a display unit, a first optical element, a detector, a control unit and a processor configured to generate an image. In embodiments of the disclosure, the processor 1320 responsible for generating the image displayed by the display unit 150 can be provided as part of the HMD 20 or the processor 1320 may be provided as part of the games console 300, the intermediate device 350 or another device comprising a CPU. For the case where the processor 1320 is provided separate to the HMD 20, the processor 1320 may communicate with the HMD 20 via a wired or wireless communication, such that the HMD 20 can communicate data to the processor 1320 and the image can be generated by the processor 1320 in accordance with the communicated data, and the generated image can be communicated to the HMD for display by the display unit 150.

Referring to FIGS. 13*a* and 13*b*, the display unit 150 and the first optical element 160 can be positioned with respect to each other as shown in FIG. 3. When an image is displayed by the display unit 150, the light emitted by the display unit 150 can be directed by the first optical element 160 in a direction towards an eye 100 of the user 10 and the light from the display unit 150 can be viewed by the user's eye 100. The display unit 150 and the first optical element 160 can be configured so that light is emitted by the display unit 150 and directed by the first optical element 160 so that a first eye of the user can observe a displayed image via the first optical element 160.

The first optical element 160 can be positioned in an optical path between the user's eye and the display unit 150 so that the eye of the user observes the image displayed by the display unit 150 via the first optical element 160. In some examples, the first optical element 160 can direct light from a first portion of the display unit 150 for viewing by the user so that the first eye of the user can observe the image in the first portion via the first optical element 160, and the second optical element 160 can direct light from a second portion of the display unit 150 for viewing by the user so that the second eye of the user can observe the image in the second portion via the second optical element 160. In this case a left image may be displayed to the left eye and a right image may be displayed to the right eye such that the user's eyes observe a stereoscopic image pair. Alternatively or in addition, a first display unit 150 may be provided for displaying an image to be observed by the user's first eye via the first optical element 160 and a second display unit 150 may be provided for displaying an image to be observed by the user's second eye via the second optical element 160.

The first optical element 160 is configured to direct light so that the eye of the user observes the displayed image via the first optical element 160, and a configuration (geometric arrangement) of the first optical element 160 can be controlled by adjusting at least one of a position and an orientation of the first optical element 160. In other examples, the configuration can be adjusted by warping or changing the shape or optical properties of the optical element. The first optical element 160 may comprise a plurality of lenses comprising one or more from the list consisting of: a Fresnel lens; a hybrid Fresnel lens; a convex lens; and a concave lens. It will be appreciated that other suitable types of lens are also considered and the first optical element 160 may comprise any suitable combination of lenses. The plurality of lenses may be arranged with respect to each other so that the optical axis for each lens is substantially aligned with the optical axis for every other lens of the optical element 160, and thus the optical element 160 may have an optical axis that is common to each of the plurality of lenses. For example, for a plurality of lenses this may be achieved by aligning the geometric centre of each lens with the geometric centre of every other lens, such that the optical axis of a lens (straight line passing through the geometetrical centre of a lens) passes through the geometric centre of every other lens. Alternatively or in addition, the first optical element 160 may comprise one or a plurality of mirrors comprising one or more from the list consisting of: a plane mirror; a convex mirror; and a concave mirror. It will be appreciated that the first optical element 160 may comprise any suitable combination of mirrors, in which one or more of the mirrors may be either fully reflective or partially reflective. The position of each of the one or more lenses and/or one or more mirrors of the first optical element 160 can be arranged with respect to each other such that the optical element 160 has a single optical axis.

Figure 14:
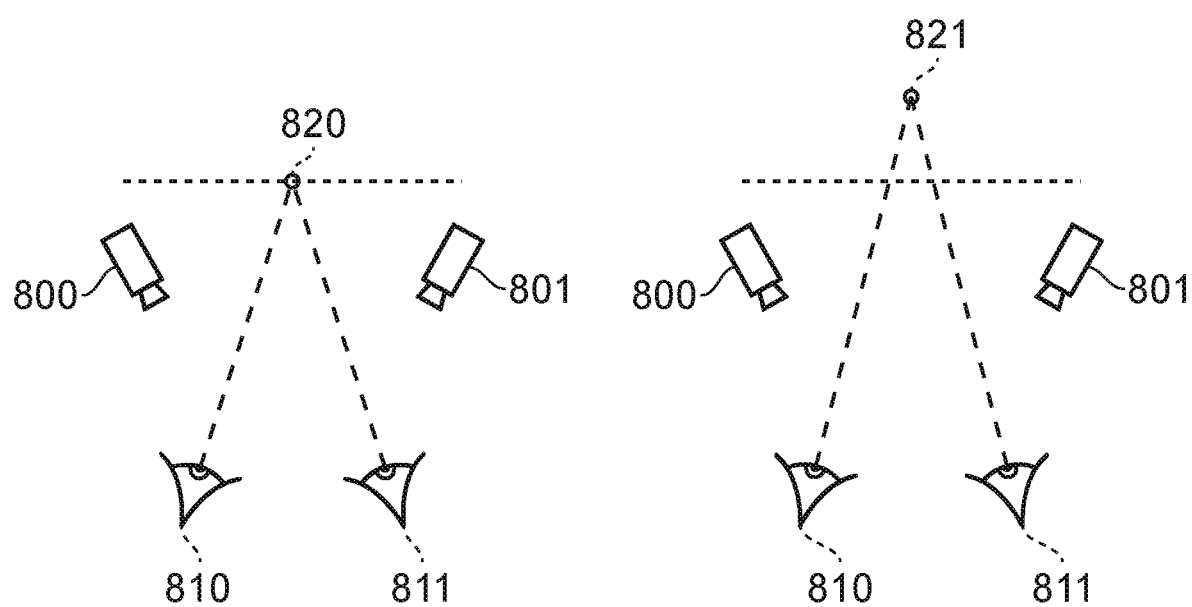
FIG. 14 schematically illustrates detecting a gaze direction and determining a point of attention in an image using vergence of the eyes.

The HMD apparatus comprises one or more detectors 322 configured to detect a physical direction in which at least one of the user's eyes is pointing, or in other words, the direction of the user's gaze. For example, the HMD apparatus may comprise one or more infrared or near-infrared light sources and one or more respective detectors 322, such as eye tracking cameras, which are used to detect the orientation of at least one of the user's eyes. The light source can be used to illuminate the user's eye to create reflections of the structure of the eye and the movement of each eye can be tracked by capturing successive images of the eye. FIG. 14 shows two eye tracking cameras 800 and 801 that are used to detect the orientation of the eyes 810 and 811 in an HMD apparatus and detect a point of attention in a displayed image. By comparing information about the orientation of each eye 810/811, the so-called vergence of the eyes can be detected. The vergence can then be used to detect where on a display unit 820 (or with respect to a virtual image of a display, as in an HMD) the viewer is looking, and at which apparent depth the viewer's attention is directed in the case of a 3D image. Alternatively or in addition, the orientation of just one of the eyes 810 and 811 can be used to determine a line of sight along which the user's gaze is directed. This means that the detector 322 can detect a gaze direction of the user's eye and based on the detected gaze direction it is possible to detect where on the display unit 820 the user is looking, or in other words, a point of attention in the image displayed by the display unit 820 of the display unit 150. The point of attention can be behind or in front of the virtual screen by which three-dimensional images are displayed to the user, such as at a point 821.

Referring again to FIGS. 13a and 13b, in embodiments of the disclosure the HMD apparatus comprises a control unit 1310 configured to control the configuration of the first optical element 160 responsive to the detected gaze direction. The detector 322 may provide information indicative of the detected gaze direction to the control unit 1310 and the control unit 1310 can control the configuration of the first optical element 160 responsive to the gaze direction detected for the user's eye. In some examples, the configuration of the first optical element 160 can be controlled by mechanically adjusting at least one of the position and the orientation of the first optical element 160. The control unit 1310 can control a mechanical adjustment unit, provided as part of the HMD, in order to adjust the configuration of the first optical element 160 responsive to the detected gaze direction.

For example, the mechanical adjustment unit may comprise one or more electric motors (such as one or more stepper motors) to translate and/or rotate the optical element to be changed in configuration. A frame may be provided that at least partially surrounds the perimeter of first optical element 160, and one or more respective portions of the frame can be physically connected to the mechanical adjustment unit by one or more structural members (e.g. supporting struts). The control unit 1310 may control the mechanical adjustment unit to independently adjust a configuration of any of the one or more of the structural members, by controlling any of the one or more electric motors, in order to mechanically adjust the configuration of the first optical element 160. This means that the configuration of the optical element 160 can be moved and/or rotated in a controlled manner in response to the gaze direction detected by the detector 322 according to the mechanical adjustment imparted on each structural member connected to the frame. The control unit 1310 can be configured to control the configuration of the first optical element 160 by controlling at least one of the three dimensional position (x,y,z coordinates) and the orientation of the first optical element 160 in accordance with gaze direction detected by the detector 322.

Alternatively or in addition, the position of the user's eye with respect to the display unit 150 may be initially identified and used for calibration purposes in order to determine a plurality of predetermined configurations for the first optical element 160 for an individual user. The plurality of predetermined configurations may be determined, and the control unit 1310 can be configured to control the configuration of the first optical element 160 so that the first optical element 160 can have any configuration from the plurality of predetermined configurations in accordance with the detected gaze direction. The plurality of predetermined configurations may be determined based on an initial calibration procedure that identifies a position of at least one of the user's eyes and a position of the display unit 150. The plurality of predetermined configurations can then be determined based on the relative positioning of the user's eye and the display unit 150, so that the first optical element 160 can be restricted to configurations within the field of view of the user's eye which direct light from the display unit 150 for viewing by the user's eye. Therefore, the plurality of predetermined configurations that can be acquired by the first optical element 160 may be determined based on the measured position of the user's eye with respect to the position of the display unit 150, and the first optical element 160 can be prevented from acquiring configurations for which the eye of the user cannot observe the image via the first optical element 160.

Alternatively or in addition, the control unit 1310 may determine the plurality of predetermined configurations for the first optical element 160 that can direct light from the display unit 150 for viewing by the user's eye, in which each predetermined configuration comprises a predetermined orientation and an associated predetermined position. For example, a first predetermined configuration may comprise a first predetermined orientation and an associated first predetermined position, and a second predetermined configuration may comprise a second predetermined orientation and an associated second predetermined position. The control unit can be configured to control the configuration of the first optical element 160 in response to the detected gaze direction so that the first optical element 160 acquires the first predetermined configuration for a first detected gaze direction and the first optical element 160 is controlled to acquire the second configuration when a second gaze direction is detected. For example, the configuration of the first optical element 160 may be adjusted by the mechanical adjustment unit under control of the control unit 1310 so that the first optical element 160 maintains an approximately constant radial distance from the user's eye, and the orientation of the first optical element 160 changes depending on the position of the first optical element 160 along the circular arc. Therefore, for each position along the circular arc the first optical element 160 has an associated orientation.

It will be appreciated that the techniques described above can similarly be implemented for the second optical element 160 provided for the user's second eye, and as such the control unit 1310 can be configured to control the configuration of the second optical element 160 (provided for the user's second eye) responsive to the gaze direction detected for the user's second eye. The control unit 1310 can independently control the configuration of the first optical element 160 and the configuration of the second optical element 160 according to the principles outlined above.

Figure 15:
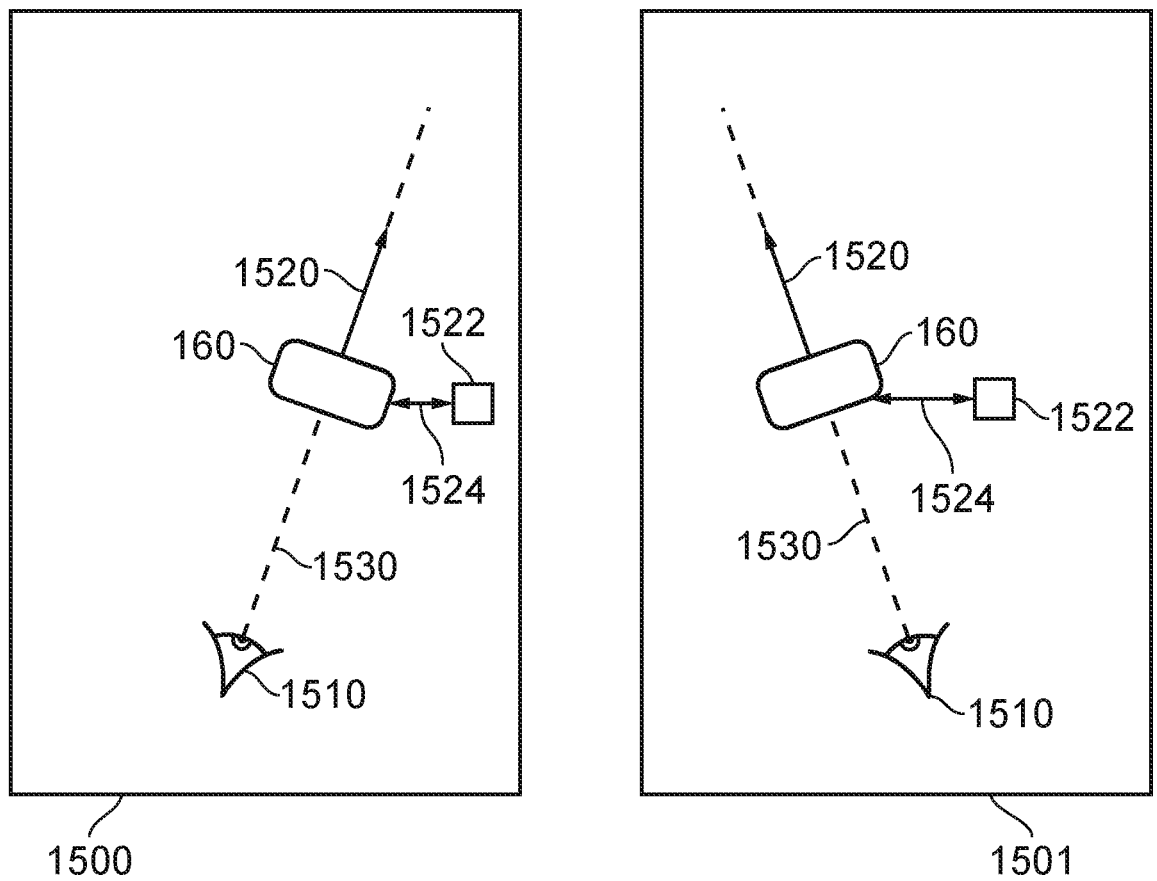
FIG. 15 schematically illustrates an optical element for which the configuration is controlled in response to a detected gaze direction.

FIG. 15 schematically illustrates an optical element for which the configuration is controlled in response to a detected gaze direction. In embodiments of the disclosure, the control unit 1310 can be configured to control the configuration of the first optical element 160, for example using a mechanical adjustment unit 1522 such as one or more motors as discussed above, linked to the first optical element 160 by a linkage 1524, so that the optical axis 1520 associated with the first optical element 160 is substantially coincident with the detected gaze direction 1530 for the user's eye 1510. A first example 1500 is shown where the gaze direction 1530 of the user's eye 1510 and the optical axis 1520 associated with the first optical element 160 are visually represented by the dashed line and the arrow, respectively. In the first example 1500, the control unit 1310 controls the configuration of the first optical element 160 responsive to the gaze direction 1530 detected by the detector 322. The optical axis 1520 associated with the first optical element 160 is shown in the first example 1500 as being coincident with the gaze direction 1530 detected for the user's eye 1510. In the first example 1500, the optical axis 1520 associated with the first optical element 160 is substantially aligned with and substantially overlaps the detected gaze direction 1530. This provides an example of a control unit 1310 configured to control a configuration of a first optical element 160 in response to a detected gaze direction so that an optical axis 1520 associated with the first optical element 160 is substantially coincident with the detected gaze direction 1530 for the user's eye 1510.

The mechanical adjustment unit 1522 provides an example of an actuator, usable as part of an HMD as discussed above and responsive to the control unit, to vary the configuration of at least the first optical element. The actuator may comprise one or more motors to translate and/or rotate the first optical element.

A second example 1501 is shown for a detected gaze direction that is different to the gaze direction detected in the first example 1500. For example, the first example may occur at a time t1 and the second example may occur at a time t2, where the time t2 is later than the time t1, or vice versa. In the second example 1501, the control unit 1310 controls the configuration of the first optical element 160 responsive to the detected gaze direction 1530 such that the optical axis 1520 associated with the first optical element 160 is coincident with detected gaze direction 1530 for the user's eye 1510. It will be appreciated that two different examples 1500, 1501 are shown where the optical axis for the first optical element 160 is substantially coincident with the detected gaze direction in both examples even though the detected gaze direction is different in the two examples.

In embodiments of the disclosure, the control unit 1310 can be configured to control the configuration of the first optical element 160 so that the optical axis 1520 associated with the first optical element 160 is substantially coincident with the detected gaze direction 1530 for the user's eye, and the configuration of the first optical element can be controlled responsive to the detected gaze direction so that the user's eye observes the point of attention in the image displayed by the display unit 150 via a central portion of the first optical element 160. The configuration of the first optical element 160 can be controlled responsive to the detected gaze direction for the user's eye so that the optical axis of the optical element 160, which represents a line passing through the geometrical centre of the first optical element 160 and parallel to the axis of symmetry of the first optical element 160, is substantially coincident with the detected gaze direction 1530 for the user's eye 1510. The optical element 160 may comprise a plurality of lenses and each lens has an optical axis passing through the centre of curvature of the lens and parallel to the axis of rotational symmetry. Each lens of the optical element 160 can be arranged so that the optical axis of a lens passes through the centre of curvature for another lens and the optical axis for each lens is substantially coincident with the optical axis for another lens of the optical element 160. This means that the optical element 160 has an associated optical axis 1520 that is substantially coincident with the optical axis for each of the constituent lenses. By controlling the configuration of the optical element 160, the optical element can be configured so that the user's gaze is directed through a central portion of the optical element 160 and the user's eye 1510 can observe the point of attention in the image displayed by the display unit 150 via the central portion of the first optical element 160 along the optical axis of the first optical element 160. As such the control unit 1310 can control the configuration of the optical element 160 in response to the detected gaze direction and the user's eye can observe the point of attention in the image via the central portion of the optical element for any gaze direction within the user's field of view.

As described previously the control unit 1310 may control the configuration of the optical element 160 by controlling a mechanical adjustment unit comprising one or more electric motors, and at least one of the position and orientation of the optical element 160 may be adjusted. As such, the control unit 1310 can control the configuration of the first optical element 160 so that the optical axis 1520 is either coincident with the user's gaze direction 1530 or as close to coincident as possible depending on the granularity with which the configuration can be controlled. The control unit 1310 may control the configuration of the optical element 160 using predetermined step sizes. For example, the position may be adjusted using a step size such as 0.1 mm in the x,y or z direction, and the orientation may be adjusted using a steps size of 1 or 2 degrees (other step sizes are similarly considered). The control unit 1310 can be configured to control the configuration of the optical element 160 in order to minimise a difference between a vector representing the user's gaze direction 1530 and a vector representing the optical axis 1520 of the first optical element 160, so that a cross product of the two vectors is substantially zero or as close to zero as possible.

Figure 16:
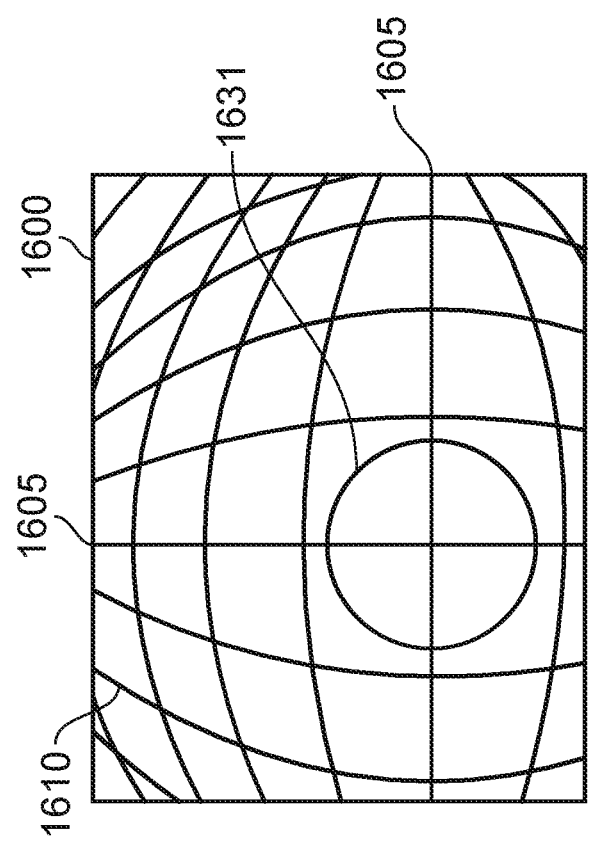
FIG. 16 schematically illustrates an image observed by a user where a point of attention in the image is observed with an approximately constant pixel density.
Figure 16:
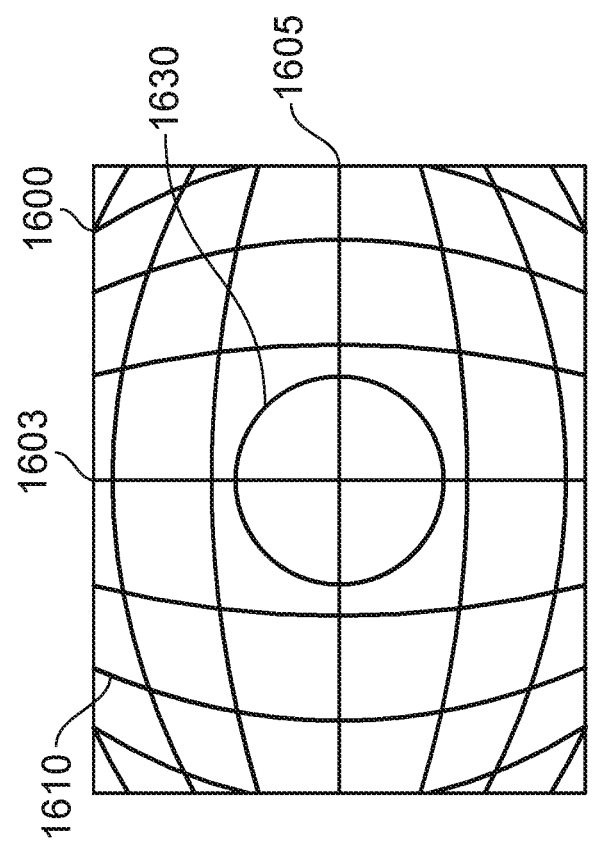

FIG. 16 schematically illustrates an image observed by a user where a point of attention in the image is observed with an approximately constant pixel density. In embodiments of the disclosure, the control unit can be configured to control the configuration of the first optical element responsive to the detected gaze direction and a point of attention in the image can be observed by the user as having an approximately constant pixel density for any gaze direction within the field of view. An example of barrel distortion for the image observed by the user's eye via the optical element 160 will be described, but it will be appreciated that similar principles can be applied for pincushion distortion of the image observed by the user's eye. For illustrative purposes the point of attention is shown as a circle in the observed image 1600, which represents a portion of the image within which the user's gaze is determined to be directed. As described previously with reference to FIG. 12, a straight line 1605 indicates that the portion of the image observed by the user's eye has a position that is not displaced with respect to the expected position for an undistorted image, and a bowed line 1610 indicates that the portion of the image observed by the user's eye has a position that is geometrically displaced with respect to the expected position for the undistorted image. As such, the portion of the observed image 1600 for which the lines 1605 are straight can be observed by the user with no optical distortion or minimal optical distortion and this portion of the image thus provides a true representation of the image as displayed by the display unit 150.

A first point of attention 1630 in the image 1600 observed by the user is shown for a first gaze direction detected by the detector 322, where the first point of attention 1630 is shown at a position in the centre of the user's field of view at the centre of the image 1600. In this case, the control unit 1310 controls the configuration of the first optical element 160 in order for the optical axis of the optical element 160 to be substantially coincident with the user's gaze direction and the lines representing the degree of optical distortion are straight 1605 for the portion of the image corresponding to the first point of attention 1630 in the observed image 1600. The user can thus observe the first point of attention 1630 in the image 1600 via the first optical element 160 with no optical distortion or minimal optical distortion, and the first point of attention 1630 can be observed by the user as an undistorted representation of the image displayed by the display unit 150.

A second point of attention 1631 in the image 1600 is shown for a second gaze direction detected by the detector 322, where the second point of attention 1631 in the observed image 1600 is displaced from the centre of the user's field of view. For this case, the control unit 1310 controls the configuration of the first optical element 160 in response to the detected gaze direction so that the optical axis of the first optical element 160 is substantially coincident with the user's gaze direction even when the user's gaze direction is directed away from the centre of the user's field of view. The lines representing the degree of distortion are straight 1605 for the portion of the image corresponding to the second point of attention 1631 in the observed image 1600, and the user can observe the second point of attention 1631 via the optical element 160 with no optical distortion or minimal optical distortion.

Light from the image displayed by the display unit 150 can be directed by the first optical element 160 so that the eye of the user observes the image via the first optical element 160. The display unit 150 may have a given pixel resolution (e.g. 1200×1800 pixels per eye or 960×1080 pixels per eye) resulting in a given pixel density (pixels per centimetre or pixels per degree) for the display unit 150 depending on the geometric properties of the display unit 150. The light from the individual pixels of the display unit 150 can be directed by the first optical element 160 for viewing by the user, and as noted previously, the magnification (ratio of a subject's real size to an observed size of the subject) may vary for different portions of the optical element 160 depending on the geometry of the optical element 150.

A comparison between the two different points of attention 1630 and 1631 in the image 1600, shows that a point of attention in the image 1600 can be observed with an approximately constant pixel density by controlling the configuration of the optical element 160, by the control unit 1310, so that the point of attention in the image can be viewed via the same portion (central portion) of the optical element 160 for any gaze direction within the user's field of view. Viewing a point of attention 1630, 1631 with the user's gaze direction being substantially coincident with the optical axis for the first optical element 160 can allow any point of attention 1630, 1631 in the image to be observed by the user with similar optical properties. The first point of attention 1630 can be viewed by the user via the first optical element 160 with the optical axis substantially coincident with the first gaze direction, such that the pixels on the display unit 150 are observed by the user as being magnified via the optical element with a given magnification. When the user observes the second point of attention 1631 (displayed by the display unit with the same pixel density as the first point of attention), the optical axis is substantially coincident with the second gaze direction and the pixels on the display unit 150 can be observed by the user as being magnified via the optical element with the same magnification as when observing the first point of attention. Therefore, if the first point of attention is displayed by the display unit 150 with a given pixel density and the second point of attention is displayed with the same pixel density 150, the optical axis associated with the first optical element 160 can be controlled to substantially coincide with the detected gaze direction so that both points of attention can be observed by the user as having an approximately constant pixel density regardless of the position of the point of attention within the user's field of view. For example, depending on the properties of the optical element 160, the image observed by the user may have a pixel density that is greater than the native pixel density of the display unit 150, and the control unit 1310 may control the configuration of the first optical element 160 in response to the detected gaze direction such that an approximately constant magnification of the point of attention in the image can be maintained.

As noted previously, a different magnification may occur when the user's gaze is directed through a peripheral portion of the optical element 160 compared to when the user's gaze is directed through a central portion of the optical element 160, and different points of attention within the user's field of view may be observed with different pixel densities depending on whether or not the user's gaze direction and the optical axis are substantially coincident. An approximately constant pixel density can be presented to the eye of the user for any point of attention in the observed image 1600 by controlling the configuration of the first optical element 160 so as to align and overlap the optical axis associated with the first optical element 160 with the detected gaze direction such that the two are substantially coincident with each other. Therefore, the image can be observed by the user's eye with the optical properties of the optical element 160 remaining approximately constant for any gaze direction within the user's field of view. This means that the user can observe a point of attention 1630, 1631 in the image with an approximately constant pixel density for any gaze direction within the user's field of view. Therefore, the control unit 1310 can be configured to control the configuration of the first optical element 160 so that the user's gaze is substantially coincident with the optical axis associated with the first optical element 160, and the user can observe the point of attention via the same central portion of the optical element 160 for any gaze direction within the field of view, and an approximately constant pixel density can be observed for any point of attention.

The control unit 1310 may control the configuration of the first optical element 160 in response to any detected gaze direction within the user's field of view so that the optical axis of the first optical element can be made to substantially coincide with the detected gaze direction and the point of attention in the image can always be observed by the user for a configuration where the gaze direction is directed along the optical axis of the first optical element 160. In a traditional arrangement, a point of attention located in a peripheral portion of the user's field of view is typically observed by the user via a peripheral portion of the optical element 160 where optical distortion effects (e.g. barrel distortion or pincushion distortion) are significantly greater compared to the central portion of the optical element 160. This arrangement can control the configuration of the first optical element in response to a detected gaze direction and the user can observe a point of attention in a peripheral portion of the field of view via a central portion of the optical element 160 so that optical distortion effects can be inhibited.

Figure 17A:
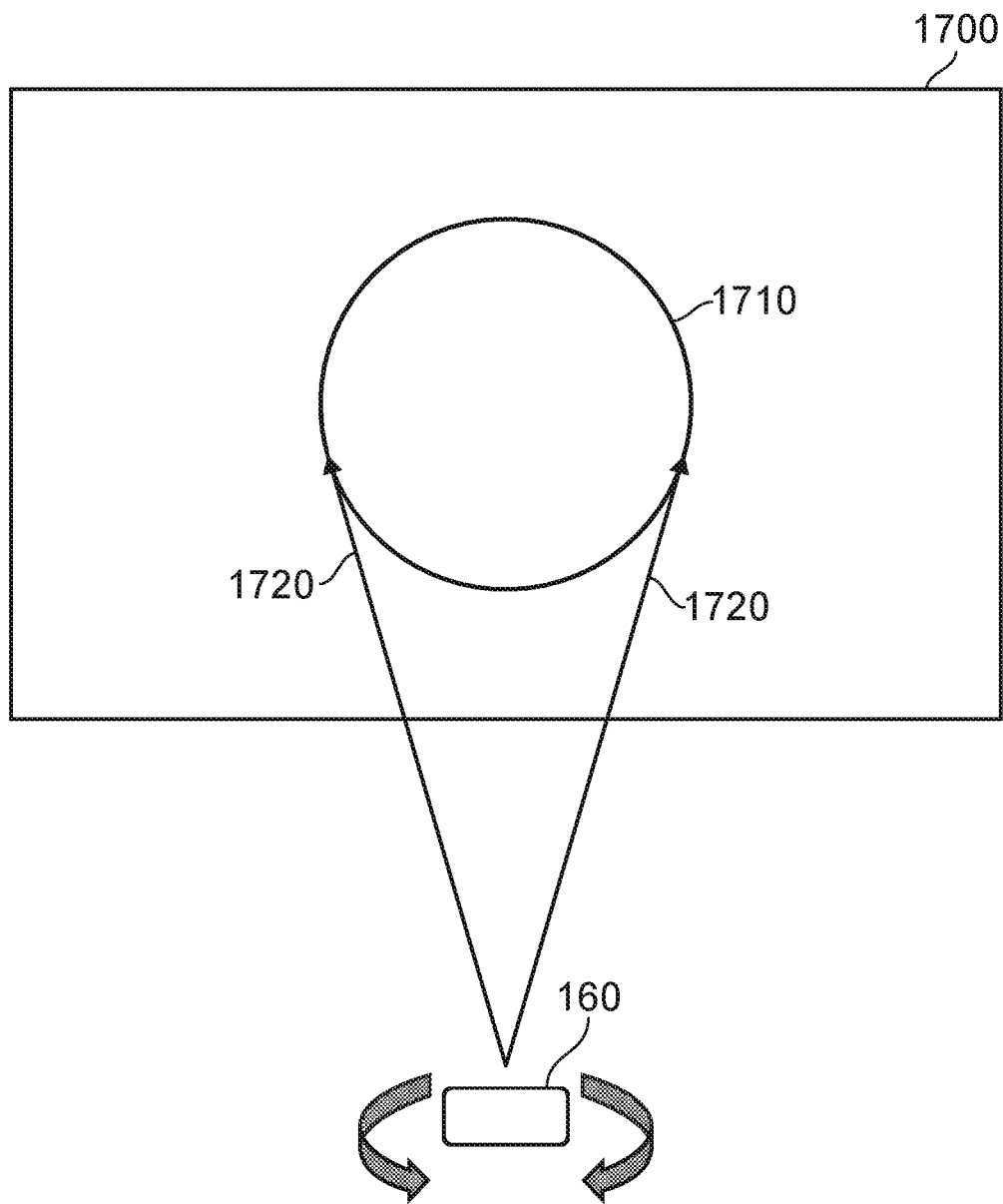
FIG. 17a schematically illustrates a range of possible configurations of an optical element for which an optical axis associated with the optical element is limited to within a central portion of a user's field of view.
Figure 17B:
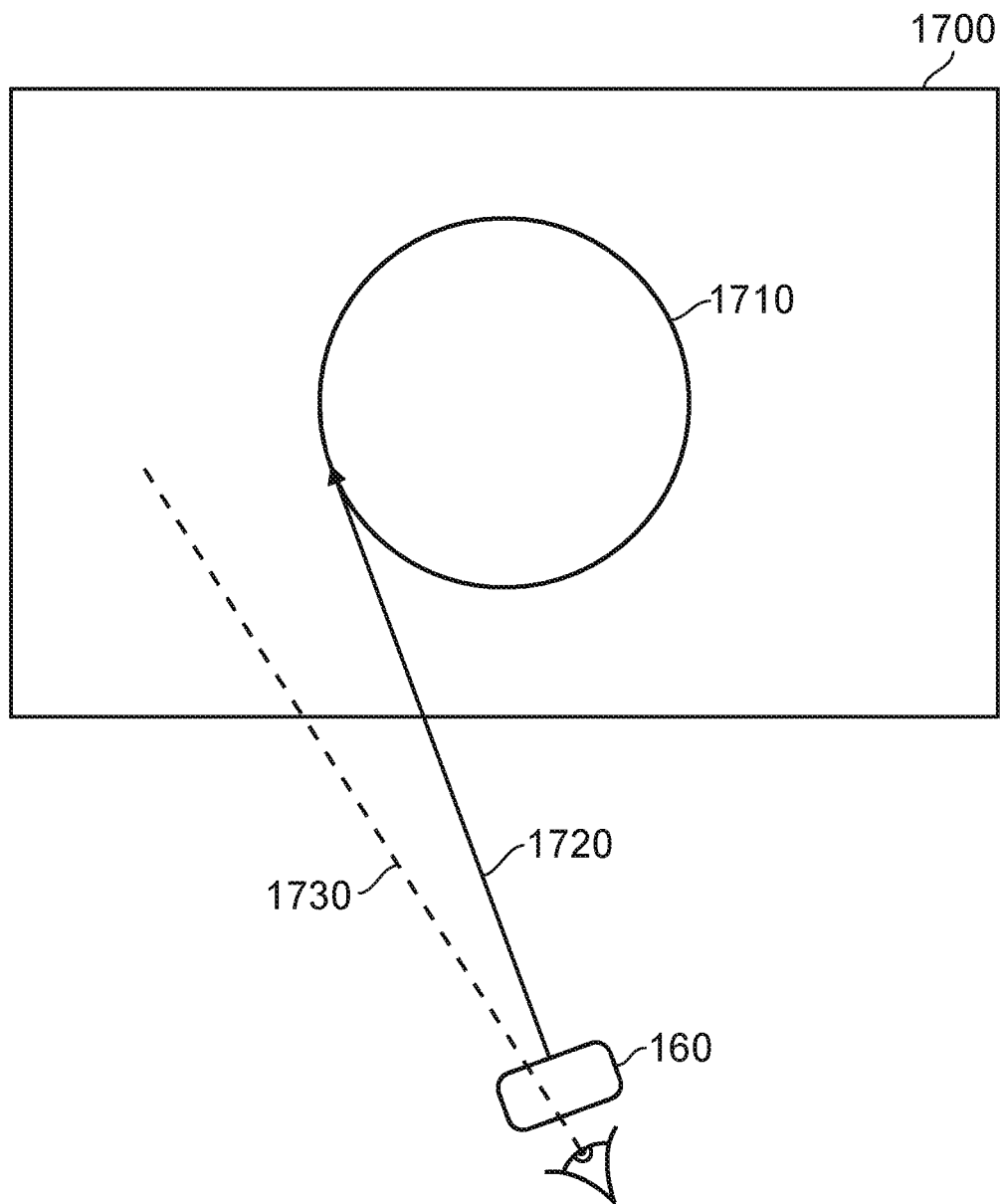
FIG. 17b schematically illustrates an optical element for which an optical axis associated with the optical element is limited to within a central portion of a user's field of view when the detected gaze direction is not within the central portion of the user's field of view.

FIG. 17a schematically illustrates a range of possible configurations of an optical element for which an optical axis associated with the optical element is limited to within a central portion of a user's field of view. In embodiments of the disclosure, the control unit 1310 can be configured to control the first optical element 160 to have a configuration that limits the optical axis 1720 associated with the first optical element 160 to within a central portion 1710 of the user's field of view 1700, even if the user's gaze is directed outside of that region (in which case, for example, a nearest point within the region 1710 could be selected as shown in FIG. 17b). The user's field of view 1700 is shown for when an image is observed by the user's eye via the first optical element 160, where a central portion 1710 of the user's field of view 1700 is shown as a circular portion of the field of view 1700. In some examples, the central portion 1710 of the user's field of view may be represented by a square, a rectangular or hexagonal portion instead of a circular portion. The possible configurations of the first optical element 160 can be restricted by the control unit 1310 so that the optical axis 1720 associated with the first optical element 160 is limited to within the central portion 1710 of the user's field of view 1700. The control unit 1310 may control the configuration of the first optical element 160 so that the optical axis 1720 associated with the first optical element 160 can be controlled to be substantially coincident with the detected gaze direction when the user's gaze is directed within the central portion 1710 of the user's field of view 1700.

FIG. 17b schematically illustrates an optical element for which an optical axis associated with the optical element is limited to within a central portion of a user's field of view when the detected gaze direction is not within the central portion of the user's field of view. In embodiments of the disclosure, when the detected gaze direction 1730 of the user's eye is not within the central portion 1710 of the user's field of view 1700, the control unit 1310 can be configured to control the configuration of the first optical element 160 so that the optical axis 1720 associated with the first optical element 160 is directed within the central portion 1710 of the user's field of view 1700 with a direction that is nearest to being coincident with the user's current gaze direction 1730 within the user's field of view 1700. The user's field of view 1700 is shown for when an image is observed by the user's eye via the first optical element 160, and the detected gaze direction 1730 for the user's eye is not within the central portion 1710 of the field of view 1700 for the user's eye. When the gaze of the user's eye is not directed within the central portion 1710 of the field of view 1700, the control unit 1310 can control the configuration of the first optical element 160 by controlling at least one of the position and the orientation of the first optical element 160. The first optical element 160 can be controlled to have a configuration such that the optical axis 1720 associated with the first optical element 160 is directed to pass through a portion of the central portion 1710 of the user's field of view 1700 for which the direction of the optical axis 1720 is as close as possible to being coincident with the user's current gaze direction 1730. This means that the configuration of the first optical element 160 can be controlled to limit the optical axis 1720 to a direction within the central portion 1710 of the user's field of view whilst acquiring a configuration such that the direction of the optical axis 1720 is as close to being coincident with the detected gaze direction as possible. Hence more generally, when the gaze direction 1730 of the user's eye is outside of the central portion 1710 of the user's field of view 1700, the first optical element 160 can be controlled to have a configuration where the optical axis 1720 is most similar to the current gaze direction 1730 whilst retaining an optical axis configuration that is restricted to within the central portion 1710 of the user's field of view 1700.

When the current gaze direction 1730 of the user's eye is detected to be within the central portion 1710 of the user's field of view 1700, then the control unit 1310 can control the configuration of the first optical element 160 such that a vector representing the optical axis 1720 associated with the first optical element 160 is substantially parallel with and substantially overlaps with (substantially coincident) a vector representing the current gaze direction 1730. As such, the control unit 1310 can control the configuration of the first optical element 160 so that the optical axis 1720 associated with the first optical element 160 tracks the detected gaze direction 1730 within the central portion 1710 of the field of view 1700, and the optical axis 1720 and the gaze direction 1730 can be substantially coincident with each other for any detected gaze direction 1730 within the central portion 1710 of the field of view 1700. The optical axis 1720 associated with the first optical element 160 can be redirected in response to changes in the detected gaze direction in order to coincide with detected gaze direction 1730, and the optical axis 1720 and the gaze direction 1730 may be substantially coincident with each other up until they reach the boundary (perimeter) of the central portion 1710. When the gaze direction is detected to move from within the central portion 1710 of the field of view 1710 to a portion of the field of view 1700 outside the central portion 1710 by crossing the boundary, the control unit 1310 can control the configuration of the first optical element 160 so as to limit the optical axis 1720 to a direction that corresponds to the boundary of the central portion 1710. As the gaze direction 1730 moves within the portion of the field of view 1700 outside the central portion 1710, the first optical element's configuration can be controlled accordingly so that the optical axis is corresponds to a point on the boundary of the central portion for which the optical axis 1720 is as close as possible to being coincident with the user's current gaze direction 1730.

It will be appreciated that the above teachings can be applied similarly for a second optical element 160 configured to direct light from the image displayed by the display unit 150 for viewing by the user so that the second eye of the user observes the image via the second optical element 160.

Figure 17C:
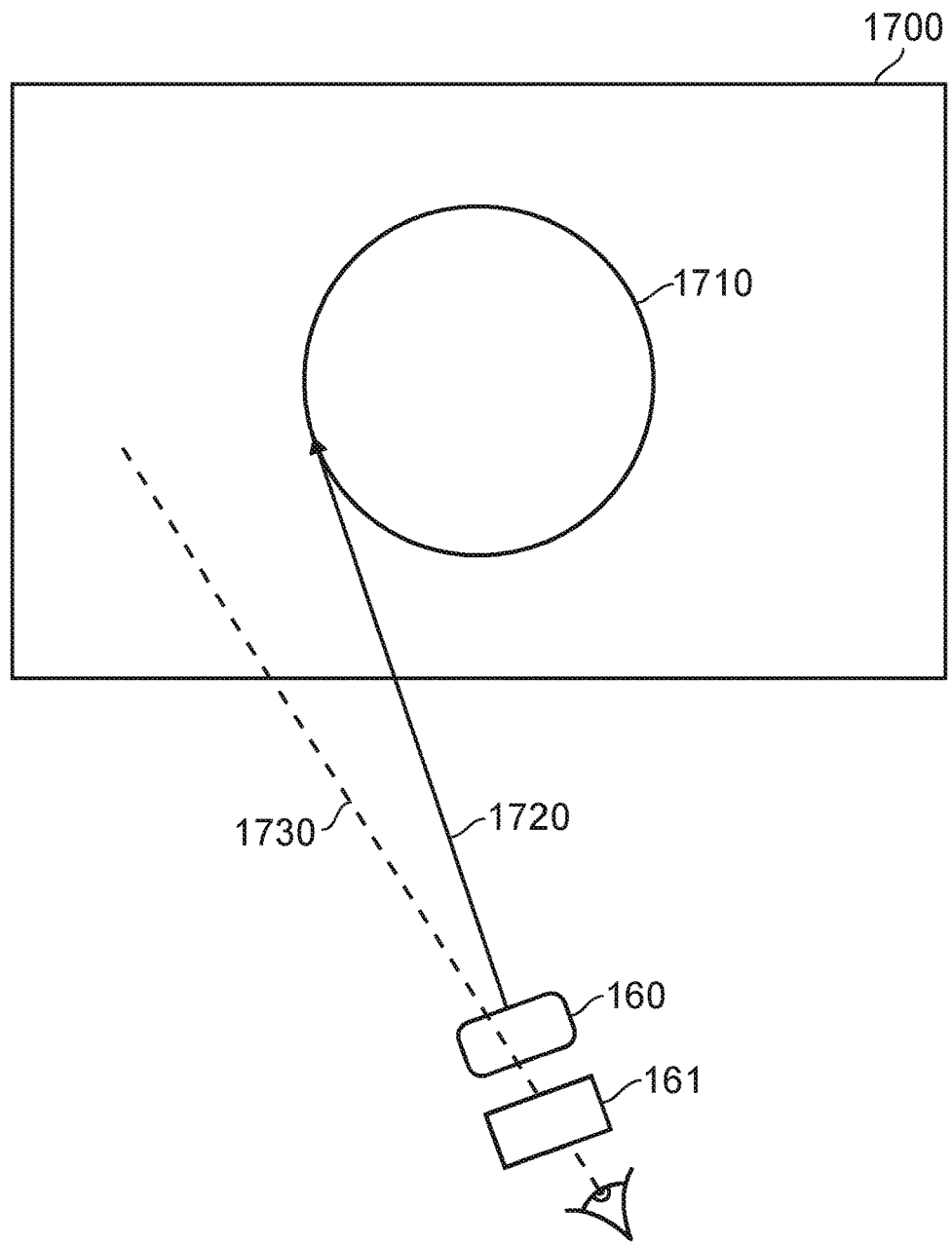
FIGS. 17c and 17d schematically illustrate further examples of optical elements.
Figure 17D:
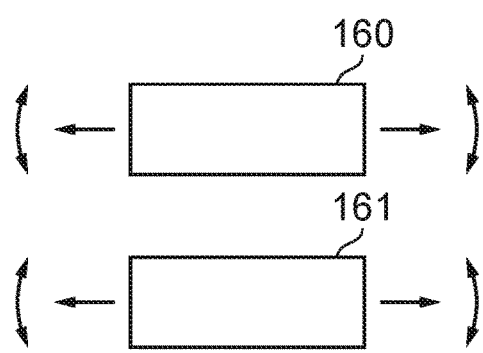

In embodiments of the disclosure, a third optical element 161 can be positioned in an optical path between the first optical element 160 and the user's eye, and similarly a fourth optical element can be positioned in an optical path between the second optical element and the user's second eye. An example for one eye is shown schematically in FIG. 17c. The first optical element and the third optical element can be positioned in front of the user's first eye so that the first eye of the user observes the image displayed on the display unit 150 via the first optical element and the third optical element. The second optical element and the fourth optical element can be similarly arranged so that the second eye of the user observes the image displayed on the display unit 150 via the second optical element and the fourth optical element. The control unit 1310 can be configured to control the configuration of the first optical element with respect to the configuration of the third optical element responsive to the detected gaze direction, and the control unit 1310 can similarly control the configuration of the second optical element and the fourth optical element. As described previously, each optical element may comprise one or more lenses and/or one or more mirrors and may be individual configurable as discussed above and as shown schematically in FIG. 17d. It will be appreciated that the following techniques can also be implemented for the second optical element and the fourth optical element.

In some examples, the configuration of the third optical element may be fixed and the control unit 1310 may be configured to control the configuration of the first optical element with respect to the fixed configuration of the third optical element. This means that the light from the display unit 150 can be firstly directed by the first optical element onto the third optical element, and the light can then be directed from the third optical element for viewing by the user's eye. In this case, the third optical element closest to the user's eye may have a fixed configuration whereas the configuration of the first optical element may be controlled in response to the detected gaze direction. Alternatively, the control unit 1310 may be configured to control the configuration of the first optical element and to control the configuration of the third optical element. The configurations of the two respective optical elements may be controlled in accordance with each other in response to the detected gaze direction. For example, the configurations of the first optical element and the second optical element may be controlled in accordance with each other so that at least one optical axis tracks the detected gaze direction and is substantially coincident with the detected gaze direction. In some examples, the configurations of the two respective optical elements may be controlled so that an optical axis associated with each optical element is substantially coincident with the gaze direction and a distance between the two respective optical elements may be adjusted.

In embodiments of the disclosure, the control unit 1310 can be configured to control the processor 1320 responsible for generating the image displayed by the display unit 150 of the HMD responsive to the detected gaze direction. As described previously with reference to FIG. 13a and FIG. 13b, the processor 1320 responsible for generating the image displayed by the display unit 150 can be provided as part of the HMD 20 or the processor 1320 may be provided separate to the HMD as part of the games console 300, the intermediate device 350 or another device comprising a CPU. The gaze direction of the user's eye can be detected by the detector 322 and data indicative of the detected gaze direction can be communicated from the detector 322 to the control unit 1310 via a wired or wireless communication link. The control unit 1310 can communicate a control signal to the processor 1320, based on the detected gaze direction, via a wired or wireless communication (such as a WiFi or a Bluetooth® connection) in order to control the processor 1320 responsive to the detected gaze direction. The processor 1320 can be controlled by the control unit 1310 and data comprising generated image data can be communicated from the processor 1320 to the control unit 1310 via a wired or wireless communication link. Image processing performed by the processor 1320 can thus be controlled by the control unit 1310 and an image can be displayed by the display unit 150 in response to the detected gaze direction. As such, an image can be generated by the processor 1320 and displayed by the display unit 150 under the control of the control unit 1310 in response to the gaze direction. For example, the processor 1320 may be configured to generate stereoscopic images comprising left images and right images. Data indicative of the generated stereoscopic images can be communicated from the processor 1320 to the control unit 1310 and stereoscopic images may be displayed on the display unit 150. In some examples, video data comprising successive three-dimensional images can be generated by the processor 1320 and communicated to the control unit 1310 for display by the display unit 150.

In order for images to be observed by the human eye with the highest resolution, incident light must be received by the most central portion of the retina (macula). Although the average field of view for the human eye is approximately 100 degrees vertical and 150 degrees horizontal, the human eye is only capable of processing sharp and clear images within a small angular range centred upon the gaze direction of the eye, because only light that is incident upon the macula can be observed by the human eye with the highest resolution. Consequently, only a small fraction of the entire field of view can be observed in the highest resolution by the human eye, and the majority of the field of view is observed with a lower resolution. The portion of the field of view that can be observed by the human eye in the highest resolution is centred upon the gaze direction of the eye and typically corresponds to approximately 18 degrees of the field of view.

Figure 18:
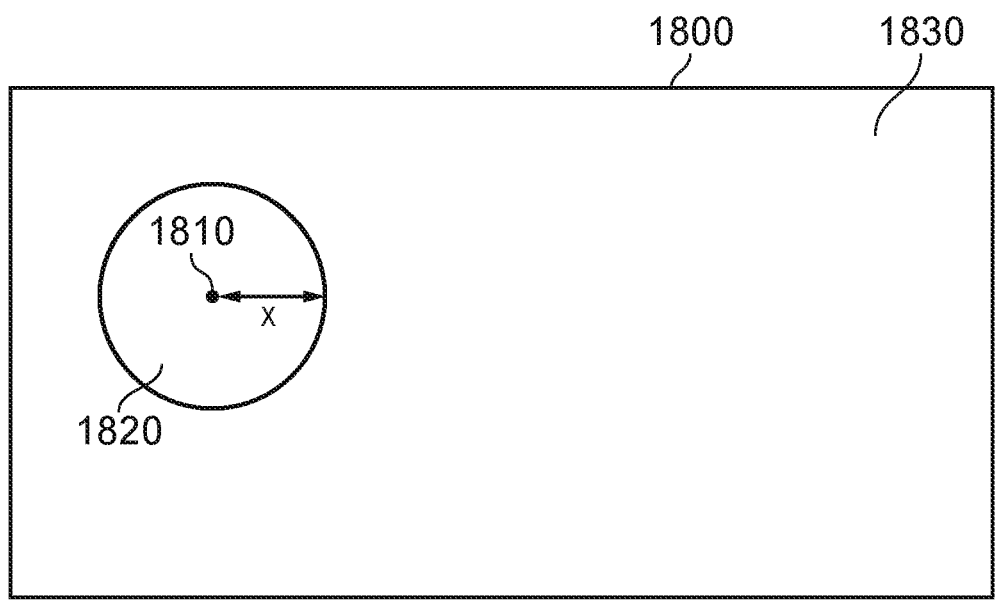
FIG. 18 schematically illustrates a point of attention in an image displayed by a display unit where a first portion of the image has a higher pixel density than a second portion of the image.

FIG. 18 schematically illustrates a point of attention in an image displayed by the display unit 150 where a first portion of the image has a higher pixel density than a second portion of the image. In embodiments of the disclosure, the control unit 1310 can be configured to control the processor 1320 to generate a portion of the image within a predetermined distance of the point of attention 1810 in the image 1800 with a higher pixel density (e.g. pixels per centimetre, pixels per degree) than a portion of the image not within the predetermined distance of the point of attention 1810. The control unit 1310 can be configured to detect a point of attention 1810 in the image 1800 displayed by the display unit 150 based on the detected gaze direction. In accordance with the detected gaze direction and the position of the point of attention 1810, the control unit 1310 can control the processor 1320 to generate the image 1800 with a first portion 1820 having a higher pixel density than a second portion 1830 of the image. The first portion 1820 is centred on the point of attention 1810 and surrounds the point of attention 1810. This means that the portion of the image that is proximate to the point of attention 1810 can be displayed with a higher image quality than the second portion of the image which is not proximate to the point of attention 1810.

In some examples the control unit 1310 can control the processor 1320 to generate the first portion 1820 of the image 1800 so that the first portion 1820 is centred upon the detected gaze direction for the user's eye, and the first portion 1820 of the image 1800 has a circular shape with a predetermined radius such that the first portion corresponds to approximately 20 degrees of the field of view. The magnitude of the predetermined radius (predetermined distance) of the first portion 1820 defines the geometric size of the first portion 1810 of the image 1800. It will be appreciated that a range of different values may be selected for the magnitude of the predetermined radius and the geometric size of the first portion 1810 may correspond to any suitable angular portion of the field of view for the user's eye (e.g. 25, 30, 35, 40 or 45 degrees of the field of view).

The first portion 1820 of the image 1800 within the predetermined distance of the point of attention 1810 may be generated as a circular portion that is centred upon the point of attention 1810 with a radius of the circle representing the predetermined distance (shown as x in FIG. 18). The first portion 1820 of the image 1800 may be generated with a greater number of pixels per centimetre (or per centimetre squared) than the second portion 1830 of the image not within the predetermined radial. As such, the first portion 1820 of the image 1800 can be generated by the processor 1320 with a first pixel density and the second portion 1830 can be generated with a second pixel density, in which the first pixel density is greater than the second pixel density. Alternatively, the first portion 1820 of the image 1800 may be represented as a square, rectangular or hexagonal portion that is centred upon the point of attention 1810 in the image.

The control unit 1310 can control the processor 1320 in order to generate the image 1800 with the first portion 1820 having a pixel density equivalent to the native pixel density of the display unit 150, and the second portion 1830 can be generated with a pixel density lower than the native pixel density of the display unit 150 by subsampling the pixels of the image 1800. The pixels of the image 1800 can be subsampled to allow the image 1800 to be generated with the second portion 1830 having a lower pixel density than the first portion 1820 whilst maintaining the same field of view for the image 1800. For example, the display unit 150 may have a native image resolution (e.g. 960×1080 pixels per eye, or 1200×1080 pixels, or any suitable pixel resolution), and a native pixel density depending upon the geometric size of the display unit 150 and the native image resolution. The first portion 1820 of the image 1800 may be generated by the processor 1320 with a pixel density corresponding to the native pixel density of the display unit 150, such that the first portion 1820 can be rendered with a number of pixels per centimetre (or pixels per degree) that is equivalent to the greatest pixel density that is supported by the display unit 150. The second portion 1830 of the image 1800 may be generated with a lower pixel density by subsampling the pixels of the image 1800. In some examples, every other row and every other column of pixels in the second portion 1830 of the image 1800 may be removed (2× subsampling) whilst preserving the aspect ratio and the field of view. It will be appreciated that other techniques such as 4× subsampling or subsampling with Gaussian pre-filtering may be implemented in order to generate the second portion 1830 with a lower pixel density than the native pixel density of the display unit 150.

In embodiments of the disclosure, the control unit 1310 can be configured to control the processor 1320 to generate the portion of the image not within the predetermined radial distance of the point of focus by reprojecting an image from a previous image frame. The control unit 1310 can control the processor 1320 according to the detected gaze direction so that the first portion 1820 of the image displays an image of the current image frame and the second portion 1830 displays an image of a previous image frame. An image from a previous image frame may be reprojected in the second portion 1830 of the image, and the pixels of the reprojected image may be subsampled such that the second portion 1830 of the image can be generated with a lower pixel density than the first portion 1820 of the image. This means that the second portion 1830 of the image 1800 may be generated by the processor 1320 with a lower frame rate than the first portion 1820 of the image 1800. For example, the second portion 1830 of the image 1800 may be generated by reprojecting every frame at least once or reprojecting every other frame.

Figure 19:
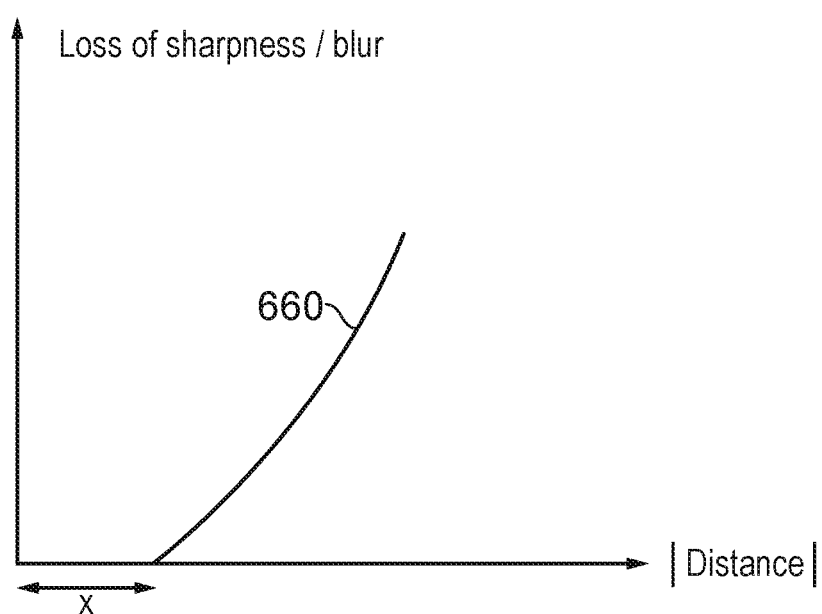
FIG. 19 schematically illustrates a blurring function varying with respect to distance from a point of attention in an image.

FIG. 19 schematically illustrates a blurring function varying with respect to distance from a point of attention in an image. The graph shows increasing blurriness (equivalent to the loss of sharpness) on the vertical axis and distance from the point of attention is shown on the horizontal axis. In embodiments of the disclosure, the control unit 1310 can be configured to control the processor 1320 to generate the image by applying a blurring function to the image depending upon a predetermined distance from the point of attention in the image. The processor 1320 may apply a blurring function 660 to the image so that a portion of the image not proximate to the point of attention in the image is blurred whilst no blurring or a smaller degree of blurring is applied for a portion of the image within the predetermined distance from the point of attention. The blurring function 660 can be applied so that the magnitude of the degree of blurring varies according to a distance from the point of attention in the image. This means that portions of the image that are peripheral to the user's line of sight can be generated by the processor 1320 with a greater apparent blurriness than portions of the image that are closer to the point of attention in the image.

It will be appreciated that the gradient of the blurring function 660 shown in FIG. 19 can be adjusted and the starting point may be positioned at any predetermined distance (x) from the point of attention depending on the properties of the scene displayed in the image or the position of the point of attention within the image. Note that the predetermined distance shown as "x" in FIG. 19 corresponds to the predetermined distance "x" shown in FIG. 18. The magnitude of the predetermined distance (and the starting point) may be adjusted to either increase or decrease the distance from the point of attention at which blurring is applied so that the blurring function 660 is applied for either a smaller or a larger portion of the image, respectively.

The blurring function describes the 'amount' of blurring to apply, and this blurring can be applied using any appropriate method, an example of which is now described.

Gaussian blur is a common method used to apply blur to images by using a Gaussian function to produce a weighting function in order to generate new values for pixels based upon the value of the pixels about them. This reassigning of pixel values based upon the values of surrounding pixels generates a blurrier image by reducing the variation between neighbouring pixels. A general two-dimensional Gaussian function is:

$$G(x, y) = \frac{1}{2\pi\sigma^2} e^{-\frac{x^2+y^2}{2\sigma^2}}$$

where σ is the standard deviation of the Gaussian function (representing the amount or degree of blur to be applied in the present example). This function generates sets of concentric circles of equal value about a point, the values of which are used as weightings when assigning a new value to pixels. The distribution that is generated is used to build a kernel (also known as a convolution matrix) which is applied to the original image, the result of which is a weighted averaging of a pixel's value depending on neighbouring pixels.

The kernel that is generated describes a convolution such that a pixel's original value has the highest weighting and the weighting of nearby pixel values decreases with distance from the pixel the blurring is being applied to. The weighting (and thus the degree of blurriness that is applied) may be varied by changing the value of σ, as a small value of σ produces a narrower, taller Gaussian distribution which results in the pixel to which the blurring is applied remaining largely unchanged because the weighting of surrounding pixels is much lower in comparison; this corresponds to a small degree of blurring. Varying σ in the opposite direction, a larger value of σ will result in a broader distribution in which the pixel value weighting decreases more slowly with distance from the original pixel; this translates to a greater degree of blurring than the smaller value of σ. Relating this to a generated blurring function, it is apparent that a Gaussian blur could be applied to image elements at each distance with a varying σ value.

Figure 20A:
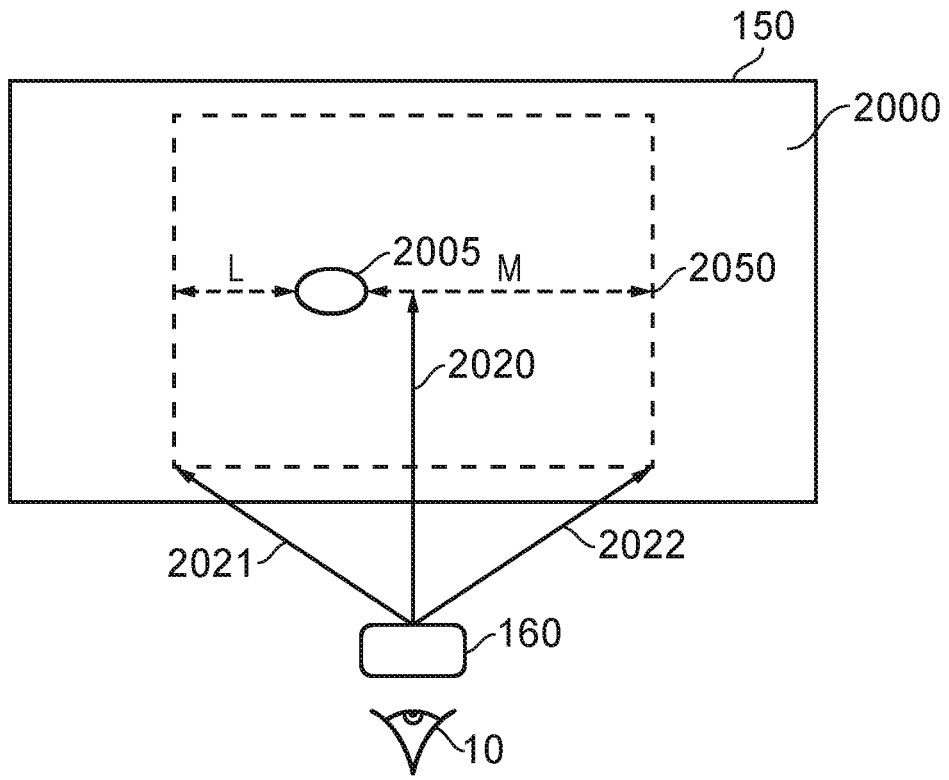
FIG. 20a schematically illustrates an example of an image for display by a display unit of an HMD that can be warped in accordance with a configuration of an optical element.
Figure 20B:
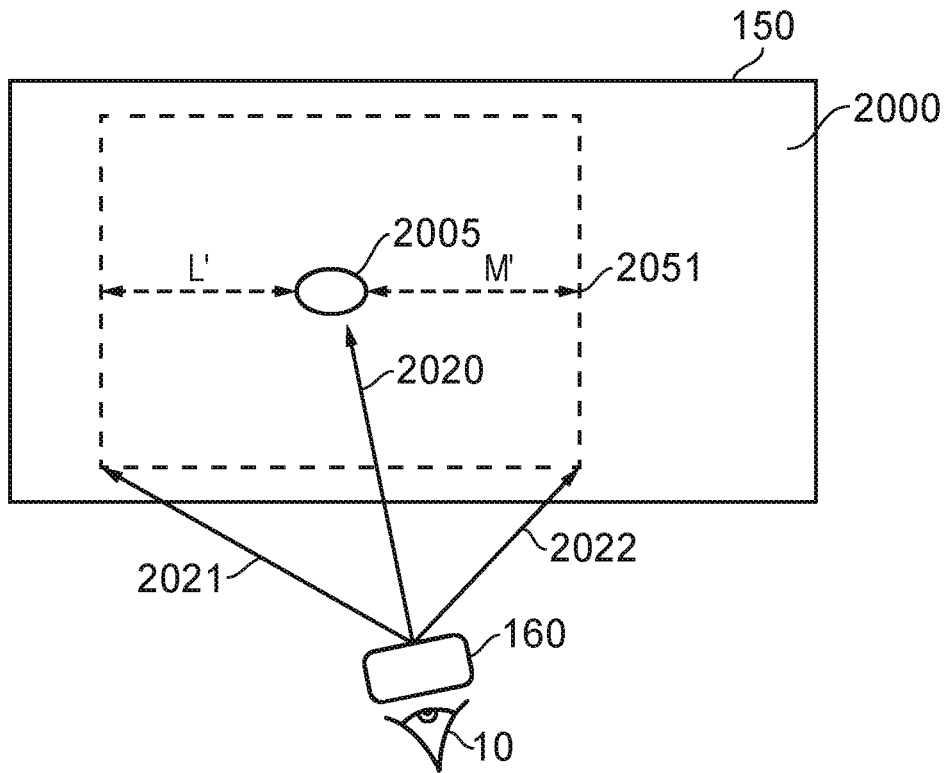
FIG. 20b schematically illustrates an image for display by a display unit of an HMD that is generated by applying a warping to the image in accordance with a configuration of an optical element.

FIGS. 20a and 20b schematically illustrate an example of an image displayed by a display unit of an HMD that is generated by applying a warping to the image in accordance with a configuration of a first optical element. In embodiments of the disclosure, the control unit can be configured to control the processor to generate the image by applying a warping to the image, in which the control unit can be configured to control the warping applied to the image and the configuration of the first optical element in accordance with each other so that the viewpoint of the image observed by the user remains substantially the same irrespective of the user's gaze direction. In response to the detected gaze direction, the control unit 1310 can be configured to control the configuration of the first optical element 160, and the control unit can also be configured to control the processor 1320 responsible for generating the image displayed by the display unit 150. This means that the control unit 1310 can simultaneously control both the configuration of the first optical element 160 and the warping applied to the image generated by the processor 1320. As such, the image may be generated by the processor 1320 in accordance with the configuration of the first optical element 160, so that a degree of warping can be applied to the image to be displayed by the display unit 150 depending on the configuration of the first optical element 160.

For example, a change in the configuration of the first optical element 160 may mean that the light that is directed for viewing by the user may correspond to a different portion of the display unit 150, and as such the user's eye may observe a different portion of the display unit 150 depending on the configuration of the first optical element 160. If the optical element 160 is rotated and/or moved away from the centre of the user's field of view, then the portion of the display unit 150 and the field of view observed by the user via the optical element 160 may also be moved and/or rotated such that the viewpoint of the image observed via the optical element 160 may be changed when the optical element 160 is rotated and/or moved. Therefore, the control unit 1310 can be configured to control the warping applied to the image and the configuration of the first optical element in accordance with each other. This means that portions of the image displayed by the display unit 150 can be warped, and the viewpoint of the image observed by the user's eye can remain substantially the same when the configuration of the first optical element 160 is adjusted. A varying degree of warping may be applied for different portions of the image generated by the processor 1320 in order to manipulate the shape, orientation and positions of features within the image.

FIG. 20a schematically illustrates an example in which an image 2000 comprising an image feature 2005 is displayed by the display unit 150, and the user's eye observes the image 2000 via the first optical element 160 such that the initial field of view 2050 observed by the user's eye via the first optical element 160 corresponds to the centre of the display unit 150. In this case, the configuration of the first optical element 160 is controlled so that the optical axis 2020 of the first optical element 160 is coincident with the detected gaze direction, and the direction of the user's gaze corresponds to the centre of the initial field of view 2050 for the user's eye, which corresponds to the centre of the display unit 150. The arrows 2021 and 2022 illustrate the horizontal extent of the field of view for the image observed by the user's eye via the first optical element 160. Note that the angular extent of the field of view for the image observed by the user's eye via the first optical element 160 is dependent upon the configuration of the first optical element 160 with respect to the user's eye. The arrows 2021, 2022 are drawn for illustrative purposes only and are used to show the angular extent of the field of view observed via the first optical element 160 in the horizontal direction, similar arrows can be drawn to represent the angular extent of the field of view in the vertical direction. In the example shown, the configuration of the first optical element 160 may be controlled by adjusting at least one of the position and the orientation of the first optical element 160, and the angular extent (angle between arrows 2021 and 2022) of the initial field of view 2050 for the image observed by the user's eye via the first optical element 160 may or may not remain substantially unchanged when the configuration of the first optical element 160 is adjusted depending on the configuration of the first optical element 160 with respect to the user's eye.

FIG. 20*b* schematically illustrates an example in which the gaze of the user's eye is directed away from the centre of the initial field of view 2050 observed by the user's eye via the first optical element 160, and thus away from the centre of the display unit 150. In this example, the user's gaze is directed so that the user's point of attention in the image corresponds to the image feature 2005. The configuration of the first optical element 160 is controlled so that the optical axis 2020 associated with the first optical element 160 is coincident with the user's gaze direction. Upon adjusting the configuration of the optical element 160, the portion of the display unit 150 and the portion of the displayed image 2000 corresponding to the user's second field of view 2051 observed via the optical element 160 is different with respect to the initial field of view 2050 shown in the schematic illustration in FIG. 20*a*. In the examples shown, the field of view observed via the first optical element 160 has moved to the left when comparing FIG. 20*a* with FIG. 20*b*, due to the change in the configuration of the first optical element 160. Therefore, a warping can be applied to the image 2000 displayed by the display unit 150, such that the image features in the initial field of view 2050 are warped to a position on the display unit 150 corresponding to the second field of view 2051 so that the image observed by the user's eye comprises the same image features even when the configuration of the first optical element 160 is adjusted. Therefore, the viewpoint of the observed second field of view 2051 can remain substantially the same as the viewpoint of the observed initial field of view 2050 when the first optical element 160 is adjusted from a first configuration (FIG. 20*a*) to a second configuration (FIG. 20*b*). This means that the viewpoint of the image observed by the user's eye via the optical element 160 can remain substantially the same when controlling the configuration of the first optical element 160.

The warping can be applied to the image 2000 so that at least the portion of the image corresponding to the initial field of view 2050 observed via the first optical element 160 can be manipulated according to changes in the configuration of the first optical element 160. The image features included in the portion of the display unit 150 corresponding to the field of view 2050, 2051 observed via the optical element 160 can thus remain substantially the same when the first optical element configuration changes in response to changes in the user's gaze direction.

In addition, warping can be applied to the image 2000 so that portions of the image within the field of view 2050 can be warped with respect to each other depending on the configuration of the first optical element 160. For example, when changing the configuration of the first optical element 160 from the first configuration (FIG. 20*a*) to the second configuration (FIG. 20*b*), the portion of the image labelled L in FIG. 20*a* may be warped (e.g. stretched or elongated) so that the portion of the image labelled L represents the portion of the image labelled L' in FIG. 20*b*. Similarly, the portion of the image labelled M in FIG. 20*a* may be warped (e.g. squashed, or compressed) so that the portion of the image labelled M represents the portion of the image labelled M' in FIG. 20*b* (note that similar warping may be applied with respect to the vertical axis). In some examples, the warping applied to the portions of the image labelled L and M can be non-linear, and the warping may be applied to the image as a non-linear scaling function. Consequently, the image features within the field of view observed by the user via the first optical element 160 can remain substantially the same when adjusting the configuration of the first optical element 160, and image features can be warped to positions on the display unit 150 so that the viewpoint of the field of view remains substantially the same. In addition, adjusting the configuration of the first optical element to have a configuration where the optical axis and the user's gaze direction substantially coincide with each other, can enable the user to observe image features at the periphery of the user's field of view with substantially the same image quality as when observing image features at the centre of the user's field of view.

Figure 21:
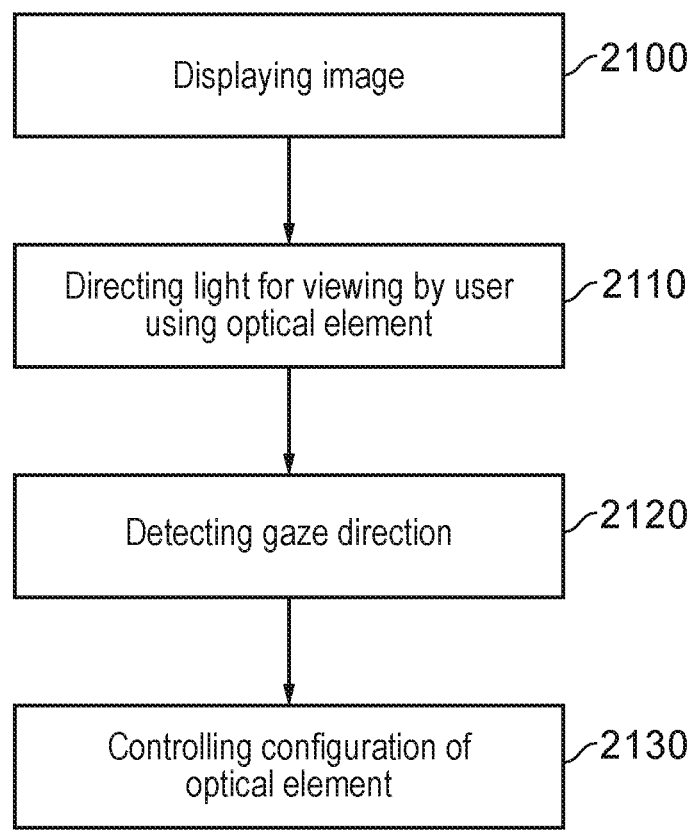
FIG. 21 is a schematic flowchart illustrating a method for controlling an image viewed by a user wearing an HMD.

FIG. 21 is a schematic flowchart illustrating a method for controlling an image viewed by a user wearing an HMD. In embodiments of the disclosure, a method for controlling an image viewed by a user wearing an HMD is provided. The method comprises:

displaying (at a step 2100) an image to a user wearing the HMD;

directing light (at a step 2110) from the displayed image for viewing by the user using a first optical element so that the eye of the user observes the image via the first optical element;

detecting (at a step 2120) a gaze direction of the user's eye; and controlling (at a step 2130) a configuration of the first optical element responsive to the detected gaze direction.

The method for controlling an image viewed by a user wearing an HMD can be performed by an apparatus such as the HMD apparatus illustrated in FIGS. 13*a* and 13*b*. The step 2100 of displaying an image to a user wearing an HMD, can be performed by displaying an image generated by the processor 1320 on the display unit 150 of the HMD. The first optical element can be configured to direct light from the image displayed by the display unit 150 for viewing by the user so that the eye of the user observes the image via the first optical element. It will be appreciated that the method illustrated in FIG. 21 can be performed for an HMD apparatus comprising at least a first optical element, and in embodiments of the disclosure the method may comprise a step of directing light from a displayed image for viewing by the user using the second optical element so that the second eye of the user observes the image via the second optical element. The step 2120 of detecting the gaze direction of the user's eye can be performed using one or more detectors 322, such as eye tracking cameras, in order to detect the orientation of at least one of the user's eyes. The step 2130 of controlling the configuration of the first optical element responsive to the detected gaze direction can be performed by a mechanical adjustment of the configuration of the first optical element 160 under the control of the control unit 1310 that receives information from the one or more detector 322 indicating the user's detected gaze direction.

Figure 22:
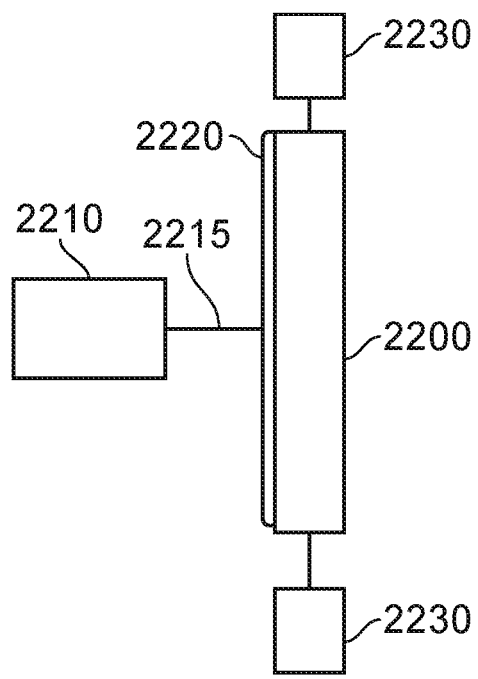
FIG. 22 schematically illustrates another example arrangement for changing the configuration of an optical element.

FIG. 22 schematically illustrates another example arrangement for changing the configuration of an optical element 2200 which may be a mirror, lens or compound arrangement of multiple mirrors and/or lenses. Various different techniques are illustrated in FIG. 22 to warp or distort the optical element 2200 so as to change its configuration; any one or more of which may be implemented in this example arrangement. These are:

(a) an electric actuator 2210 to distort the optical element 2200 by pushing or pulling by a linkage 2215;

(b) a distributed actuator 2220 such as a piezoelectric element to distort the optical element 2200 upon application of an electric current; and c) one or more actuators 2230 to apply a vertical (as drawn) force such as an inward force (towards the optical element 2200) to distort its shape. Note that just one actuator could be used relative to a fixed mounting of the optical element 2200.

These techniques can be used instead of or in addition to the motor embodiments discussed above.

FIG. 22 therefore provides an example of an actuator (usable in the HMD discussed above), responsive to the control unit, to vary the configuration of at least the first optical element. The actuator may comprise one or more actuators to distort the first optical element.

It will be apparent to a person skilled in the art that variations in the above method corresponding to operation of the various embodiments of the apparatus as described and claimed herein are considered within the scope of the present invention. It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A head-mountable display (HMD) apparatus comprising:
   a display unit configured to display an image to a user wearing the HMD;
   a first optical element configured to direct light from the image displayed by the display unit for viewing by the user so that the eye of the user observes the image via the first optical element;
   a detector configured to detect a gaze direction of the user's eye; and
   a control unit configured to control a configuration of the first optical element responsive to the detected gaze direction, wherein:
   the control unit is configured to control the first optical element to have a configuration that limits the optical axis associated with the first optical element to within a central portion of the user's field of view, and
   when the detected gaze direction of the user's eye is not within the central portion of the user's field of view, the control unit is configured to control the configuration of the first optical element so that the optical axis associated with the first optical element is directed within the central portion of the user's field of view with a direction that is nearest to being coincident with the user's current gaze direction within the field of view.

2. The HMD apparatus according to claim 1, in which the control unit is configured to detect a point of attention in the image displayed by the display unit based on the detected gaze direction.

3. The HMD apparatus according to claim 1, comprising a processor configured to generate the image displayed by the display unit, in which the control unit is configured to control the processor responsive to the detected gaze direction.

4. The HMD apparatus according to claim 3, in which the control unit is configured to control the processor to generate a portion of the image within a predetermined distance of the point of attention in the image with a higher pixel density than a portion of the image not within the predetermined distance of the point of attention.

5. The HMD apparatus according to claim 4, in which the control unit is configured to control the processor to generate the portion of the image not within the predetermined radial distance of the point of focus by reprojecting an image from a previous image frame.

6. The HMD apparatus according to claim 3, in which the control unit is configured to control the processor to generate the image by applying a blurring function to the image depending upon on a predetermined distance from the point of attention in the image.

7. The HMD apparatus according to claim 3, in which the control unit is configured to control the processor to generate the image by applying a warping to the image, in which the control unit is configured to control the warping applied to the image and the configuration of the first optical element in accordance with each other so that the viewpoint of the image observed by the user remains substantially the same irrespective of the user's gaze direction.

8. The HMD apparatus according to claim 1, in which the first optical element comprises a plurality of lenses.

9. The HMD apparatus according to claim 1, in which the control unit is configured to control the configuration of the first optical element so that the optical axis associated with the first optical element is substantially coincident with the detected gaze direction for the user's eye.

10. The HMD apparatus according to claim 9, in which the control unit is configured to control the configuration of the first optical element responsive to the detected gaze direction so that the user's eye observes the point of attention in the image via a central portion of the first optical element.

11. The HMD apparatus according to claim 9, in which by controlling the configuration of the first optical element responsive to the detected gaze direction, the point of attention in the image is observed by the user as having an approximately constant pixel density for any gaze direction within the field of view for the user's eye.

12. The HMD apparatus according to claim 1, comprising a second optical element configured to direct light from the image displayed by the display unit for viewing by the user so that the second eye of the user observes the image via the second optical element.

13. The HMD apparatus according to claim 1, comprising a third optical element positioned in an optical path between the first optical element and the user's eye, in which the control unit is configured to control the configuration of the first optical element with respect to the configuration of the third optical element responsive to the detected gaze direction.

14. The HMD according to claim 1, comprising:
   an actuator, responsive to the control unit, to vary the configuration of at least the first optical element.

15. The HMD according to claim 14, in which the actuator comprises one or both of:
   one or more motors to translate and/or rotate the first optical element; and
   one or more actuators to distort the first optical element.

16. A method for controlling an image viewed by a user wearing a head-mountable display (HMD), the method comprising:

displaying an image to a user wearing the HMD;

directing light from the displayed image for viewing by the user using a first optical element so that the eye of the user observes the image via the first optical element;

detecting a gaze direction of the user's eye; and controlling a configuration of the first optical element responsive to the detected gaze direction, wherein:

the controlling step comprises controlling the first optical element to have a configuration that limits the optical axis associated with the first optical element to within a central portion of the user's field of view, and when the detected gaze direction of the user's eye is not within the central portion of the user's field of view, the controlling step comprises controlling the configuration of the first optical element so that the optical axis associated with the first optical element is directed within the central portion of the user's field of view with a direction that is nearest to being coincident with the user's current gaze direction within the field of view.

17. A non-transitory machine-readable storage medium which stores computer software, which when executed by a computer, causes the computer to perform a method for controlling an image viewed by a user wearing a head-mountable display (HMD) by carrying out actions, comprising:

displaying an image to a user wearing the HMD;

directing light from the displayed image for viewing by the user using a first optical element so that the eye of the user observes the image via the first optical element;

detecting a gaze direction of the user's eye; and controlling a configuration of the first optical element responsive to the detected gaze direction, wherein:

the controlling step comprises controlling the first optical element to have a configuration that limits the optical axis associated with the first optical element to within a central portion of the user's field of view, and when the detected gaze direction of the user's eye is not within the central portion of the user's field of view, the controlling step comprises controlling the configuration of the first optical element so that the optical axis associated with the first optical element is directed within the central portion of the user's field of view with a direction that is nearest to being coincident with the user's current gaze direction within the field of view.

* * * * *